US008293297B2

(12) United States Patent
Orcutt et al.

(10) Patent No.: US 8,293,297 B2
(45) Date of Patent: Oct. 23, 2012

(54) COLORED STRUCTURED PROTEIN PRODUCTS

(75) Inventors: Mac W. Orcutt, St. Louis, MO (US);
Izumi Mueller, Glen Carbon, IL (US);
Thomas J. Mertle, St. Louis, MO (US);
Arno Sandoval, Wildwood, MO (US);
Patricia A. Altemueller, Webster Groves, MO (US); Santiago Solorio, Bridgeton, MO (US)

(73) Assignee: Solae, LLC, St. Louis, MO (US)

( * ) Notice: Subject to any disclaimer, the term of this patent is extended or adjusted under 35 U.S.C. 154(b) by 292 days.

(21) Appl. No.: 12/059,961

(22) Filed: Mar. 31, 2008

(65) Prior Publication Data

US 2008/0254199 A1 Oct. 16, 2008

Related U.S. Application Data

(60) Provisional application No. 60/910,261, filed on Apr. 5, 2007.

(51) Int. Cl.
*A23P 1/12* (2006.01)
(52) U.S. Cl. ........ 426/250; 426/634; 426/516; 426/523; 425/376.1; 425/464
(58) Field of Classification Search .................. 426/104, 426/250, 634, 512, 513, 516, 517, 519, 523; 425/376.1, 464
See application file for complete search history.

(56) References Cited

U.S. PATENT DOCUMENTS

| 2,682,466 A | 6/1954 | Boyer |
| 3,102,031 A | 8/1963 | MacAllister |
| 3,117,006 A | 1/1964 | Wenger et al. |
| 3,488,770 A | 1/1970 | Atkinson |
| 3,662,671 A | 5/1972 | Frederiksen et al. |
| 3,662,672 A | 5/1972 | Hoer |
| 3,793,466 A * | 2/1974 | Hawkins et al. .............. 426/274 |
| 3,814,823 A * | 6/1974 | Yang et al. .................... 426/601 |
| 3,870,805 A | 3/1975 | Hayes et al. |
| 3,881,024 A | 4/1975 | Pahoundis |
| 3,883,672 A | 5/1975 | Bone et al. |
| 3,886,299 A * | 5/1975 | Feldbrugge et al. .......... 426/656 |
| 3,897,572 A | 7/1975 | Riggs et al. |
| 3,900,576 A | 8/1975 | Schulz |
| 3,903,315 A * | 9/1975 | Giles et al. .................... 426/388 |
| 3,925,561 A | 12/1975 | Herstel et al. |

(Continued)

FOREIGN PATENT DOCUMENTS

CH 687116 9/1996

(Continued)

OTHER PUBLICATIONS

Database WPI Week 198701, Thomson Scientific, London, GB; AM 1987-002391, XP002497680 & JP61260839 A, Nov. 19, 1986 Abstract.

(Continued)

*Primary Examiner* — Drew E Becker

(74) *Attorney, Agent, or Firm* — Holly M. Amjad; J. Jason Galvez

(57) ABSTRACT

The present invention provides a process for producing a colored structured protein product with protein fibers that are substantially aligned and the resultant product. Specifically, the plant protein is combined with a colorant and extruded, forming a colored structured protein product with protein fibers that are substantially aligned and the resultant product.

20 Claims, 8 Drawing Sheets
(4 of 8 Drawing Sheet(s) Filed in Color)

U.S. PATENT DOCUMENTS

| Patent No. | | Date | Inventor | |
|---|---|---|---|---|
| 3,928,652 | A | 12/1975 | Lanter | |
| 3,930,033 | A | 12/1975 | Corliss | |
| 3,934,050 | A * | 1/1976 | Hawkins | 426/645 |
| 3,940,500 | A | 2/1976 | Sortwell | |
| 4,032,666 | A | 6/1977 | Obata et al. | |
| 4,052,517 | A | 10/1977 | Youngquist | |
| 4,061,789 | A | 12/1977 | Warren et al. | |
| 4,084,017 | A | 4/1978 | Kim et al. | |
| 4,118,164 | A | 10/1978 | Wenger et al. | |
| 4,125,630 | A | 11/1978 | Orthoefer | |
| 4,125,635 | A | 11/1978 | de Ruyter | |
| 4,132,809 | A | 1/1979 | Desrosier | |
| 4,145,447 | A | 3/1979 | Fisher et al. | |
| 4,197,323 | A | 4/1980 | Cerise et al. | |
| 4,216,240 | A | 8/1980 | Shirai et al. | |
| 4,219,576 | A | 8/1980 | Kawasaki | |
| 4,287,219 | A | 9/1981 | Fabre | |
| 4,288,397 | A | 9/1981 | Snowden | |
| 4,303,682 | A | 12/1981 | Guitteny et al. | |
| 4,332,823 | A | 6/1982 | Buemi | |
| 4,338,340 | A * | 7/1982 | Morimoto et al. | 426/104 |
| 4,361,588 | A | 11/1982 | Herz | |
| 4,369,195 | A | 1/1983 | Nelson et al. | |
| 4,376,134 | A | 3/1983 | Kumar et al. | |
| 4,391,840 | A | 7/1983 | Ederle | |
| 4,439,456 | A | 3/1984 | Kammuri et al. | |
| 4,490,397 | A | 12/1984 | Maurice et al. | |
| 4,495,205 | A | 1/1985 | Brander et al. | |
| 4,562,082 | A | 12/1985 | Morimoto | |
| 4,579,741 | A | 4/1986 | Hanson et al. | |
| 4,590,079 | A | 5/1986 | Nishimori et al. | |
| 4,752,196 | A | 6/1988 | Wolfe, Jr. | |
| 4,763,569 | A | 8/1988 | Wenger et al. | |
| 4,818,558 | A | 4/1989 | Hartman et al. | |
| 4,863,749 | A | 9/1989 | Yamada | |
| 4,868,002 | A | 9/1989 | Scaglione et al. | |
| 4,880,654 | A | 11/1989 | Okada | |
| 4,897,280 | A | 1/1990 | Ohtsu | |
| 4,910,040 | A * | 3/1990 | Sagarino et al. | 426/656 |
| 4,975,294 | A | 12/1990 | Cohen | |
| 4,995,800 | A | 2/1991 | Lupke | |
| 5,039,543 | A | 8/1991 | Lee et al. | |
| 5,300,312 | A | 4/1994 | Lusas et al. | |
| 5,333,538 | A | 8/1994 | Sawa | |
| 5,437,885 | A | 8/1995 | Lusas et al. | |
| 5,731,029 | A | 3/1998 | Karwowski et al. | |
| 5,804,246 | A | 9/1998 | Peck et al. | |
| 5,922,392 | A | 7/1999 | Kelly et al. | |
| 5,945,152 | A | 8/1999 | Purser et al. | |
| 6,319,539 | B1 * | 11/2001 | Shemer et al. | 426/656 |
| 6,358,547 | B1 * | 3/2002 | Dupont | 426/249 |
| 6,379,738 | B1 | 4/2002 | Dingman et al. | |
| 6,613,369 | B2 | 9/2003 | Gaebler | |
| 6,635,301 | B1 | 10/2003 | Howsam | |
| 2002/0142086 | A1 | 10/2002 | Gaebler et al. | |
| 2002/0160097 | A1 | 10/2002 | Altemueller et al. | |
| 2004/0206246 | A1 * | 10/2004 | Bortone et al. | 99/353 |
| 2005/0112271 | A1 | 5/2005 | Pickarski | |
| 2006/0035003 | A1 | 2/2006 | McMindes et al. | |
| 2006/0035005 | A1 | 2/2006 | McMindes et al. | |
| 2006/0035006 | A1 * | 2/2006 | McMindes et al. | 426/646 |
| 2006/0051492 | A1 | 3/2006 | Mueller et al. | |
| 2006/0073261 | A1 | 4/2006 | McMindes et al. | |
| 2007/0148323 | A1 | 6/2007 | Dingman et al. | |
| 2007/0269567 | A1 | 11/2007 | McMindes et al. | |
| 2007/0269583 | A1 | 11/2007 | McMindes et al. | |
| 2008/0069926 | A1 | 3/2008 | Mueller et al. | |
| 2008/0069927 | A1 | 3/2008 | Altemueller et al. | |
| 2008/0075808 | A1 | 3/2008 | Altemueller et al. | |
| 2008/0118607 | A1 | 5/2008 | Sandoval et al. | |
| 2008/0166443 | A1 | 7/2008 | Busse et al. | |
| 2008/0233244 | A1 | 9/2008 | Swenson | |
| 2008/0248167 | A1 | 10/2008 | McMindes et al. | |
| 2008/0254167 | A1 | 10/2008 | McMindes et al. | |
| 2008/0254168 | A1 | 10/2008 | Mueller et al. | |
| 2008/0254199 | A1 | 10/2008 | Orcutt et al. | |
| 2008/0260913 | A1 | 10/2008 | Orcutt et al. | |
| 2008/0268112 | A1 | 10/2008 | Rolan et al. | |
| 2009/0123629 | A1 | 5/2009 | Chang et al. | |
| 2009/0208633 | A1 | 8/2009 | Kyed et al. | |
| 2010/0166940 | A1 | 7/2010 | McMindes et al. | |

FOREIGN PATENT DOCUMENTS

| | | |
|---|---|---|
| DE | 139385 | 1/1980 |
| EP | 0010798 | 5/1980 |
| EP | 0048533 | 2/1982 |
| EP | 0048533 | 3/1982 |
| EP | 0385266 | 9/1990 |
| EP | 1180332 | 2/2002 |
| FR | 2218842 | 9/1974 |
| GB | 1082420 | 9/1967 |
| GB | 1173976 | 12/1969 |
| GB | 1448875 | 9/1976 |
| GB | 1464376 | 2/1977 |
| GB | 1524712 | 9/1978 |
| GB | 1548971 | 7/1979 |
| GB | 1552091 | 9/1979 |
| JP | 53-122825 | 10/1978 |
| JP | 58155060 | 9/1983 |
| JP | 61012254 | 1/1986 |
| JP | 61260839 | 11/1986 |
| JP | 63068060 | 3/1988 |
| JP | 63-240749 | 10/1988 |
| JP | 64-020059 | 1/1989 |
| JP | 01043159 | 2/1989 |
| JP | 04293455 | 10/1992 |
| JP | 06-098685 | 12/1994 |
| JP | 08066157 | 3/1996 |
| JP | 10-014499 | 1/1998 |
| JP | 2000-279099 | 10/2000 |
| JP | 2001-327253 | 11/2001 |
| JP | 2002000237 | 1/2002 |
| JP | 2003259840 | 9/2003 |
| MX | PA05004544 | 7/2006 |
| WO | 8806001 | 8/1988 |
| WO | 0069276 | 11/2000 |
| WO | 03070007 | 8/2003 |
| WO | 2004016097 | 2/2004 |
| WO | 2005092115 | 10/2005 |
| WO | 2005096834 | 10/2005 |
| WO | 2006023518 | 3/2006 |
| WO | 2006041966 | 4/2006 |
| WO | 2007038125 | 4/2007 |
| WO | 2007137122 | 11/2007 |
| WO | 2007137125 | 11/2007 |
| WO | 2008034063 | 3/2008 |
| WO | 2008036906 | 3/2008 |
| WO | 2008043076 | 4/2008 |
| WO | 2008064224 | 5/2008 |

OTHER PUBLICATIONS

Association of American Feed Control Officials, Incorporated, "Feed Ingredient Definitions" 2008 p. 259.

Yacu, Waleed, Presentation "Thermoplastic and Food Extrusion General Introduction", pp. 11-12 & 34, Jun. 25-27, 1990, East Brunswick, NJ.

Hauck, B.W., "Process Variables and their Control for the Production of Expanded Products by Extrusion Cooking", pp. 29-30, Jan. 30, 1981, Sabetha, KS.

Kearns, Joseph P. et al., Presented at the World Congress "Extrusion of Texturized Proteins", pp. 25, 31, 36-37, Oct. 2-7, 1988, Singapore.

Rokey, Galen J. et al., Presentation "Extrusion Cooked and Textured Defatted Soybean Flours and Protein Concentrates", p. 12, Sep. 1992, Budapest, Hungary.

Wenger Manufactured, Inc., "Textured Vegetable Proteins", pp. 12-13, 2000, Sabetha, KS.

Konwinski, Arthur H. "Soy Protein Concentrate Processing and Characteristics", Jul. 1, 1991, Orange Beach, AL.

Konwinski, Arthur H., Presentation "Applications of Soy in Meats", Jun. 18-20, 2001, Urbana, IL.

Cheftel, J.C. et al., "New Protein Texturization Processes by Extrusion Cooking at High Moisture Levels", Food Reviews International, 8(2), 235-275 (1992).

Clextral Group, "Protein Fibration", Marketing Material, author unknown, date unknown.

Greentex® "High Quality Textured Soy Protein", Marketing Material, author unknown, date unknown.
Vetex®, "Live Your Life to the Fullest", Marketing Material, author unknown, date unknown.
Lecomte, N. B. et al., "Soya Proteins functional and Sensory Characteristics Improved in Comminuted Meats", Journal of Food Science, vol. 58 (1993) No. 3 pp. 464-466 & 472.
Hernandez, Ernesto. "Infusing foods with fish oil", May 1, 2004.
Pedersen, H. E. et al., "Meat and Vegetarian Applications of Soy Protein Concentrates," Food Tech Europe, vol. 1, No. 5, 1994, pp. 90, 92, 94, XP009058004.
Beery, K. E. et al., "Preparation of Soy Protein Concentrate Products and Their Application in Food Systems" American Oil Chemists Society 1991, 23, 8G9.
Databse WPI Week 198343, Derwent Publications Ltd., London, GB; AN 1983-797632, XP002464088 & JP58155506 A (Cho Chokan S) Sep. 14, 1983 Abstract.
Notice of Allowance from United States Patent and Trademark Office for U.S. Appl. No. 11/437,164; Mar. 17, 2010.
Notice of Allowance from United States Patent and Trademark Office for U.S. Appl. No. 12/059,961; Nov. 17, 2010.
Notice of Allowance from United States Patent and Trademark Office for U.S. Appl. No. 10/919,421; Oct. 7, 2010.
Office Action from United States Patent and Trademark Office for U.S. Appl. No. 10/959,277; Apr. 12, 2011.
Office Action from United States Patent and Trademark Office for U.S. Appl. No. 11/749,590; Mar. 23, 2011.
Office Action from United States Patent and Trademark Office for U.S. Appl. No. 11/963,375; Dec. 9, 2010.
Office Action from United States Patent and Trademark Office for U.S. Appl. No. 11/964,538; Apr. 4, 2011.
Office Action from United States Patent and Trademark Office for U.S. Appl. No. 12/059,432; Oct. 29, 2010.
Office Action from United States Patent and Trademark Office for U.S. Appl. No. 12/057,834; Oct. 27, 2010.
Office Action from United States Patent and Trademark Office for U.S. Appl. No. 12/061,843; Oct. 29, 2010.
Office Action from United States Patent and Trademark Office for U.S. Appl. No. 12/184,983; Apr. 15, 2011.
Office Action from United States Patent and Trademark Office for U.S. Appl. No. 11/858,769; Nov. 10, 2010.
Communication from European Patent Office Examining Division for EP Patent Application No. 08745094.6, Dec. 15, 2010.
Communication from European Patent Office Examining Division for EP Patent Application No. 08744781.9, Feb. 22, 2011.
Communication from European Patent Office Examining Division for EP Patent Application No. 08745155.5, Dec. 15, 2010.
Communication from European Patent Office Examining Division for EP Patent Application No. 09712796.3, Feb. 3, 2011.
International Preliminary Report on Patentability for International Application No. PCT/US2005/029182, Feb. 20, 2007.
International Preliminary Report on Patentability for International Application No. PCT/US2005/035904, Apr. 20, 2006.
International Preliminary Report on Patentability for International Application No. PCT/US2007/080601, Apr. 7, 2009.
International Preliminary Report on Patentability for International Application No. PCT/US2007/088696, Jun. 30, 2009.
International Preliminary Report on Patentability for International Application No. PCT/US2008/059373, Oct. 13, 2009.
International Preliminary Report on Patentability for International Application No. PCT/US2008/058905, Oct. 6, 2009.
International Preliminary Report on Patentability for International Application No. PCT/US2008/059450, Oct. 6, 2009.
International Preliminary Report on Patentability for International Application No. PCT/US2008/059466, Oct. 6, 2009.
International Preliminary Report on Patentability for International Application No. PCT/US2008/072022, Feb. 2, 2010.
International Preliminary Report on Patentability for International Application No. PCT/US2009/034693, Aug. 24, 2010.
International Preliminary Report on Patentability for International Application No. PCT/US2008/059385, Oct. 13, 2009.
European Search Report European Patent Application No. 10177208.5, Nov. 24, 2010.
Office Action from Chinese Patent and Trademark Office for CN Patent Application No. 200580035176, Nov. 27, 2009.
Office Action from Chinese Patent and Trademark Office for CN Patent Application No. 200580035176, Aug. 11, 2010.
Biqing Li, Textured Soy Protein Applied in Pork Meatball, Meat Research No. 4 pp. 26 & 33-35, 2001.
Office Action from Japanese Patent and Trademark Office for JP Patent Application No. 2007-527959, Aug. 10, 2010.
Communication from European Patent Office Examining Division for EP Patent Application No. 07842971.9, Jul. 31, 2009.
Opposition filed in the European Patent Office against European Patent No. 2020868; Sep. 6, 2011.
Office Action from United States Patent and Trademark Office for U.S. Appl. No. 11/858,769; Aug. 30, 2011.
Office Action from Chinese Patent and Trademark Office for CN Patent Application No. CN200780027323.8, Aug. 31, 2011.
Office Action from Chinese Patent and Trademark Office for CN Patent Application No. CN200780034138.1, Aug. 24, 2011.
Office Action from Chinese Patent and Trademark Office for CN Patent Application No. Cn200780037387.6, Aug. 8, 2011.
Office Action from United States Patent and Trademark Office for U.S. Appl. No. 12/444,111, Oct. 27, 2011.
Office Action from United States Patent and Trademark Office for U.S. Appl. No. 11/963,375, Aug. 4, 2011.
Office Action from United States Patent and Trademark Office for U.S. Appl. No. 12/389,148, Aug. 19, 2011.
Office Action from Japanese Patent and Trademark Office for JP Patent Application No. 2007-527959, Sep. 15, 2010.
Beery, K.E., Preparation of Soy Protein Concentrate Products and Their Application in Food Systems, The Proceedings of the World Congress on Vegetable Protein Utilization in Human Foods and Animal Foodstuffs Conference, Oct. 1988, pp. 62-65, American Oil Chemist' Society, Champaign, IL USA.
Office Action from United States Patent and Trademark Office for U.S. Appl. No. 11/749,590; Mar. 13, 2012.
Office Action from United States Patent and Trademark Office for U.S. Appl. No. 12/062,366; Dec. 8, 2011.
European Search Report for EP Application No. 11164506.5 dated Sep. 28, 2011.
Japanese Patent Application No. 2009-512226 Office Action dated Apr. 16, 2012.
Japanese Patent Application No. 2009-512227 Office Action dated Apr. 16, 2012.
Chinese Patent Application No. 200780027433.4 Office Action dated Jun. 25, 2012.

* cited by examiner

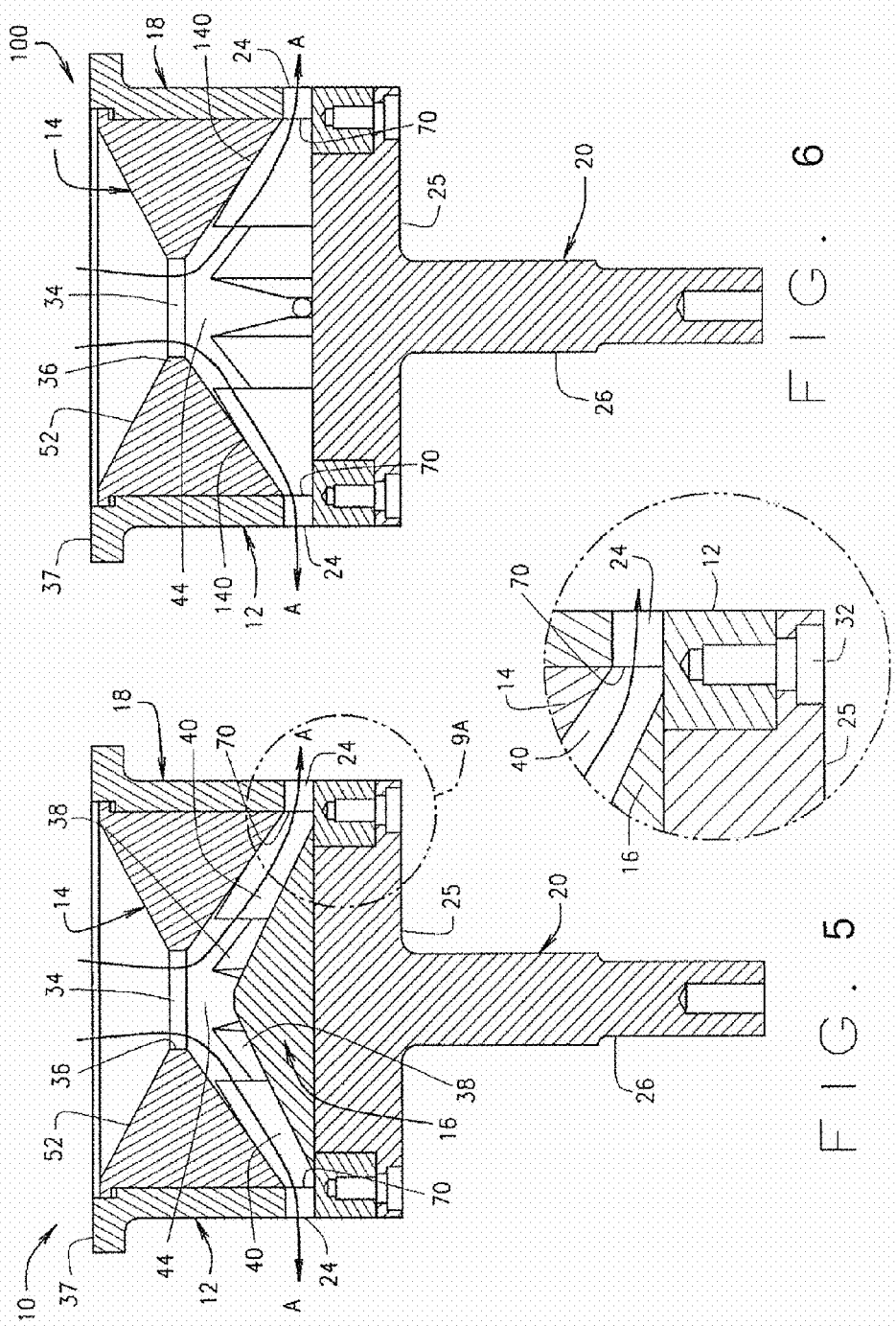

COLORED STRUCTURED PROTEIN PRODUCTS

CROSS REFERENCE TO RELATED APPLICATIONS

This application claims priority from U.S. Provisional Application Ser. No. 60/910,261 filed on Apr. 5, 2007, which is hereby incorporated by reference in its entirety.

FIELD OF THE INVENTION

The present invention provides colored structured protein products and the processes used to produce them. In particular, the colored structured protein products comprise protein fibers that are substantially aligned.

BACKGROUND OF THE INVENTION

Food scientists have devoted much time developing methods for preparing acceptable meat-like food products, such as beef, pork, poultry, fish, and shellfish analogs, from a wide variety of plant proteins. Soy protein has been utilized as a protein source because of its relative abundance and reasonably low cost. Extrusion processes typically prepare meat analogs. Upon extrusion, the extrudate generally expands to form a fibrous material. To date, meat analogs made from high protein extrudates have had limited acceptance because they lack meat-like texture characteristics, mouth feel, and visual appeal. Rather, they are characterized as spongy and chewy, largely due to the random, twisted nature of the protein fibers that are formed.

There is a still an unmet need for a colored structured protein product that simulates the fibrous structure of animal meat and has an acceptable meat-like texture and color.

SUMMARY OF THE INVENTION

One aspect of the invention provides a process for producing a colored structured protein product. The process typically comprises combining a plant protein material with at least one colorant. The mixture is extruded under conditions of elevated temperature and pressure to form a colored structured protein product comprising protein fibers that are substantially aligned.

Yet another aspect of the invention provides a process for producing a colored structured protein product. The process typically comprises combining a protein material with at least one colorant while inside an extruder. The mixture is extruded under conditions of elevated temperature and pressure to form a colored structured protein product comprising protein fibers that are substantially aligned.

A further aspect of the invention provides a process for producing a colored structured protein product. The process typically comprises combining a protein material with at least one colorant. The protein material comprising from about 45% to about 65% soy protein on a dry matter basis; from about 20% to about 30% wheat gluten on a dry matter basis; from about 10% to about 15% wheat starch on a dry matter basis; and from about 1% to about 5% fiber on a dry matter basis. The mixture is extruded under conditions of elevated temperature and pressure to form a colored structured protein product comprising protein fibers that are substantially aligned.

A still further aspect of the invention provides a process for producing a colored structured protein product. The process typically comprises combining a protein material with at least one colorant while inside an extruder. The protein material comprising from about 45% to about 65% soy protein on a dry matter basis; from about 20% to about 30% wheat gluten on a dry matter basis; from about 10% to about 15% wheat starch on a dry matter basis; and from about 1% to about 5% fiber on a dry matter basis. The mixture is extruded under conditions of elevated temperature and pressure to form a colored structured protein product comprising protein fibers that are substantially aligned.

A further aspect of the invention provides a process for producing a colored structured protein product. The process typically comprises combining a plant protein material with animal meat and at least one colorant. The mixture is extruded under conditions of elevated temperature and pressure to form a colored structured protein product comprising protein fibers that are substantially aligned.

REFERENCE TO COLOR FIGURES

The application contains at least one photograph executed in color. Copies of this patent application publication with color photographs will be provided by the Office upon request and payment of the necessary fee.

FIGURE LEGENDS

FIG. 5 depicts a cross-sectional view taken showing a flow channel defined between the die sleeve, die insert, and die cone arrangement.

FIG. 5A depicts an enlarged cross-sectional view of FIG. 5 showing the interface between the flow channel and the outlet of the die sleeve.

FIG. 6 depicts a cross-sectional view of an embodiment of the peripheral die assembly without the die cone.

Figure 9:
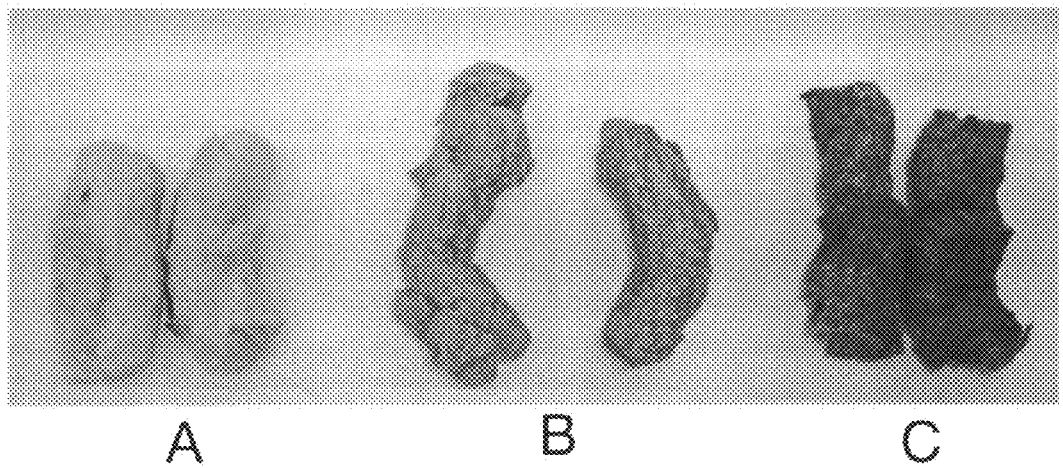

FIG. 9 depicts images of colored structured protein products of the invention. Image A is a control. It depicts a structured protein product comprising no colorant. Image B depicts a colored structured protein product comprising 0.02% by weight (red FD&C #40) colorant. And image C depicts a colored structured protein product comprising 0.25% by weight (carmine lake) colorant.

Figure 10:
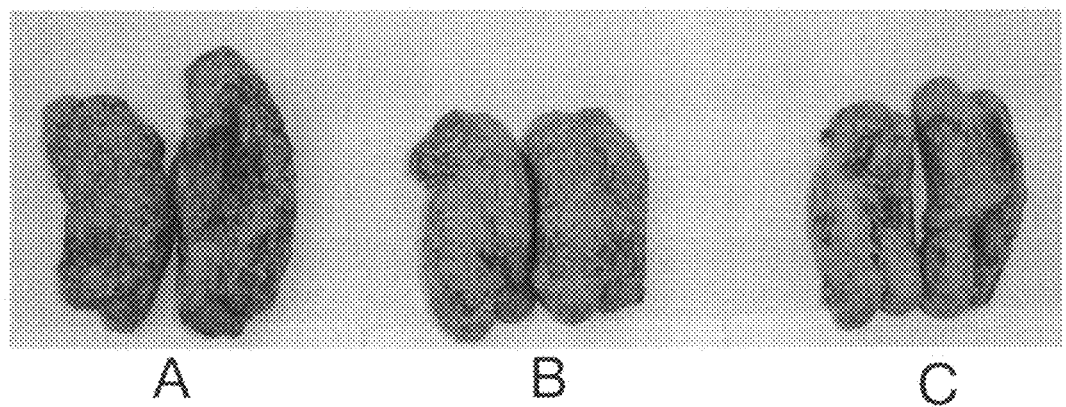

FIG. 10 depicts images of colored structured protein products of the invention. Image A depicts a colored structured protein product comprising 0.111% by weight (hydrosoluble carmine) colorant. Image B depicts a colored structured protein product comprising 0.068% by weight (hydrosoluble carmine) colorant. And image C depicts a colored structured protein product comprising 0.04% by weight (hydrosoluble carmine) colorant.

Figure 11:
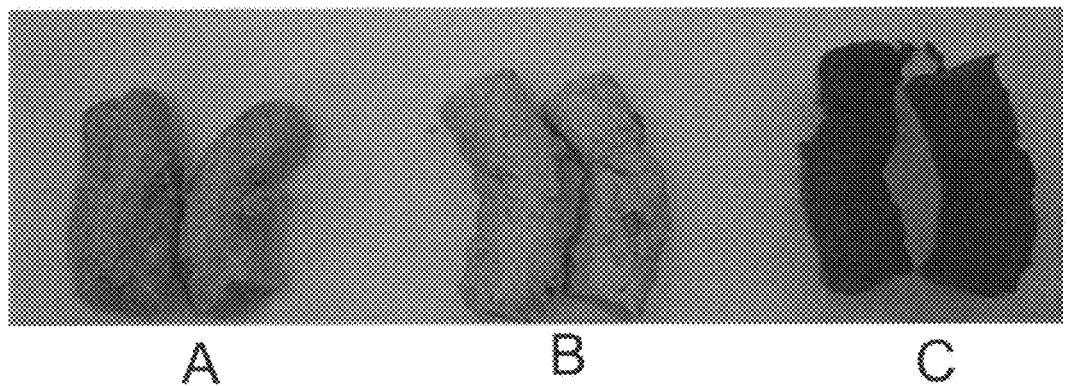

FIG. 11 depicts images of colored structured protein products of the invention. Image A is a control. It depicts a structured protein product comprising no colorant. Image B depicts a colored structured protein product comprising 0.5% by weight (titanium dioxide) colorant. And image C depicts a colored structured protein product comprising 0.25% by weight (carmine lake) colorant.

Figure 12:
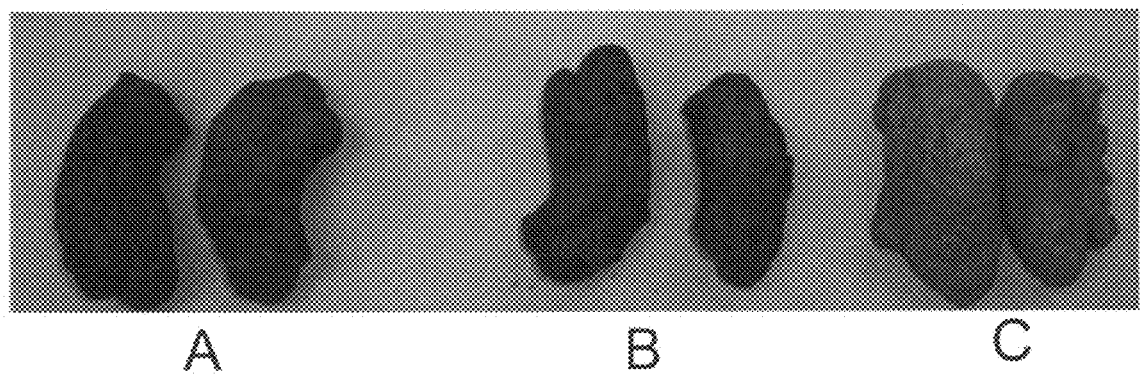

FIG. 12 depicts images of colored structured protein products of the invention. Image A depicts a colored structured protein product comprising 0.043% by weight (red FD&C #40) colorant and 0.72% by weight (caramel) colorant. Image B depicts a colored structured protein product comprising 0.70% by weight (caramel) colorant. And image C depicts a colored structured protein product comprising 0.433% by weight (annatto) colorant.

DETAILED DESCRIPTION OF THE INVENTION

The present invention provides colored structured protein products and the processes to produce them. The colored structured protein products of the invention comprise protein fibers that are substantially aligned, as described in more detail in I below. Because the colored structured protein products comprise protein fibers that are substantially aligned in a manner similar to animal meat, they have textural properties similar to those of animal meat while providing an improved nutritional profile (i.e., higher percentages of protein and lower percentages of fat).

I. Colored Structured Protein Product

The colored structured protein products have protein fibers that are substantially aligned, as described below. The colored structured protein products are made by extruding a protein-containing material through a die assembly under conditions of elevated temperature and pressure. Generally, at least one colorant is combined with the protein-containing material during the extrusion process. A variety of protein-containing materials and a variety of colorants, as described below, may be used to produce the colored structured protein products of the invention. The protein-containing materials may be derived from plant or animal sources. Additionally, combinations of protein-containing materials from various sources may be used in combination to produce colored structured protein products having substantially aligned protein fibers.

(a) Protein-Containing Materials

As mentioned above, the protein-containing material may be derived from a variety of sources. Irrespective of its source or ingredient classification, the ingredients utilized in the extrusion process are typically capable of forming colored structured protein products having protein fibers that are substantially aligned. Suitable examples of such ingredients are detailed more fully below.

The amount of protein present in the ingredient(s) can and will vary depending upon the application. For example, the amount of protein present in the ingredient(s) utilized may range from about 40% to about 100% by weight. In another embodiment, the amount of protein present in the ingredient(s) utilized may range from about 50% to about 100% by weight. In an additional embodiment, the amount of protein present in the ingredient(s) utilized may range from about 60% to about 100% by weight. In a further embodiment, the amount of protein present in the ingredient(s) utilized may range from about 70% to about 100% by weight. In still another embodiment, the amount of protein present in the ingredient(s) utilized may range from about 80% to about 100% by weight. In a further embodiment, the amount of protein present in the ingredient(s) utilized may range from about 90% to about 100% by weight.

A variety of ingredients that contain protein may be utilized in a thermal plastic extrusion process to produce structured protein products suitable for use in the ground meat simulated meat compositions. While ingredients comprising proteins derived from plants are typically used, it is also envisioned that proteins derived from other sources, such as animal sources, may be utilized without departing from the scope of the invention. For example, a dairy protein selected from the group consisting of casein, caseinates, whey protein, and mixtures thereof may be utilized. In an exemplary embodiment, the dairy protein is whey protein. By way of further example, an egg protein selected from the group consisting of ovalbumin, ovoglobulin, ovomucin, ovomucoid, ovotransferrin, ovovitella, ovovitellin, albumin globulin, vitellin, and combinations thereof may be utilized. Further, meat proteins or protein ingredients consisting of collagen, blood, organ meat, mechanically separated meat, partially defatted tissue, blood serum proteins, and combinations thereof may be included as one or more of the ingredients of the structured protein products.

It is envisioned that other ingredient types in addition to proteins may be utilized. Non-limiting examples of such ingredients include sugars, starches, oligosaccharides, soy fiber, other dietary fibers, and combinations thereof.

While in some embodiments gluten may be used as a protein, it is also envisioned that the protein-containing starting materials may be gluten-free. Further, it is envisioned that the protein-containing starting materials may be wheat-free. Because gluten is typically used in filament formation during the extrusion process, if a gluten-free starting material is used, an edible cross-linking agent may be utilized to facilitate filament formation. Non-limiting examples of suitable cross-linking agents include Konjac glucomannan (KGM) flour, beta 1.3 Glucan manufactured by Kirin Food-Tech (Japan), transglutaminase, calcium salts, magnesium salts, and combinations thereof. One skilled in the art can readily determine the amount of cross-linking material needed, if any, in gluten-free embodiments.

Irrespective of its source or ingredient classification, the ingredients utilized in the extrusion process are typically capable of forming extrudates having protein fibers that are substantially aligned. Suitable examples of such ingredients are detailed more fully below.

(i) Plant Protein Materials

In an exemplary embodiment, at least one ingredient derived from a plant will be utilized to form the colored structured protein product. Generally speaking, the ingredient will comprise a protein. The protein-containing material derived from a plant may be a plant extract, a plant meal, a plant-derived flour, a plant protein isolate, a plant protein concentrate, or a combination thereof.

The ingredient(s) utilized in extrusion may be derived from a variety of suitable plants. The plants may be grown conventionally or organically. By way of non-limiting examples, suitable plants include amaranth, arrowroot, barley, buckwheat, cassava, canola, channa (garbanzo), corn, kamut, legume, lentil, lupin, millet, oat, pea, peanut, potato, quinoa, rice, rye, sorghum, sunflower, tapioca, triticale, wheat, and mixtures thereof. Exemplary plants include soy, wheat, canola, corn, legume, lupin, oat, pea, potato, and rice.

In one embodiment, the ingredients may be isolated from wheat and soybeans. In another exemplary embodiment, the ingredients may be isolated from soybeans. In a further embodiment, the ingredients may be isolated from wheat. Suitable wheat derived protein-containing ingredients include wheat gluten, wheat flour, and mixtures thereof. Examples of commercially available wheat gluten that may be utilized in the invention include Manildra Gem of the West Vital Wheat Gluten and Manildra Gem of the West Organic Vital Wheat Gluten each of which is available from Manildra Milling. Suitable soy derived protein-containing ingredients ("soy protein material") include soy protein isolate, soy protein concentrate, soy flour, and mixtures thereof, each of which is detailed below.

In an exemplary embodiment, as detailed above, soy protein isolate, soy protein concentrate, soy flour, and mixtures thereof may be utilized in the extrusion process. The soy protein materials may be derived from whole soybeans in accordance with methods generally known in the art. The whole soybeans may be standard soybeans (i.e., non genetically modified soybeans), organic soybeans, commoditized soybeans, genetically modified soybeans, and mixtures thereof.

In one embodiment, the soy protein material may be a soy protein isolate (ISP). In general, a soy protein isolate has a protein content of at least about 90% soy protein on a moisture-free basis. Generally speaking, when soy protein isolate is used, an isolate is preferably selected that is not a highly hydrolyzed soy protein isolate. In certain embodiments, highly hydrolyzed soy protein isolates, however, may be used in combination with other soy protein isolates provided that the highly hydrolyzed soy protein isolate content of the combined soy protein isolates is generally less than about 40% of the combined soy protein isolates, by weight. Additionally, the soy protein isolate utilized preferably has an emulsion strength and gel strength sufficient to enable the protein in the isolate to form fibers that are substantially aligned upon extrusion. Examples of soy protein isolates that are useful in the present invention are commercially available, for example, from Solae, LLC (St. Louis, Mo.), and include SUPRO® 500E, SUPRO® EX 33, SUPRO® 620, SUPRO® EX 45, SUPRO® 595, and combinations thereof. In an exemplary embodiment, a form of SUPRO® 620 is utilized as detailed in Example 3.

Alternatively, soy protein concentrate may be blended with the soy protein isolate to substitute for a portion of the soy protein isolate as a source of soy protein material. Typically, if a soy protein concentrate is substituted for a portion of the soy protein isolate, the soy protein concentrate is substituted for up to about 55% of the soy protein isolate by weight. The soy protein concentrate can be substituted for up to about 50% of the soy protein isolate by weight. It is also possible in an embodiment to substitute 40% by weight of the soy protein concentrate for the soy protein isolate. In another embodiment, the amount of soy protein concentrate substituted is up to about 30% of the soy protein isolate by weight. Examples of suitable soy protein concentrates useful in the invention include PROCON™ 2000, ALPHA™ 12, ALPHA™ 5800, and combinations thereof, which are commercially available from Solae, LLC (St. Louis, Mo.).

If soy flour is substituted for a portion of the soy protein isolate, the soy flour is substituted for up to about 35% of the soy protein isolate by weight. The soy flour should be a high protein dispersibility index (PDI) soy flour. When soy flour is used, the starting material is preferably a defatted soybean flour or flakes. Full fat soybeans contain approximately 40% protein by weight and approximately 20% oil by weight. These whole full fat soybeans may be defatted through conventional processes when a defatted soy flour or flakes form the starting protein material. For example, the bean may be cleaned, dehulled, cracked, passed through a series of flaking rolls and then subjected to solvent extraction by use of hexane or other appropriate solvents to extract the oil and produce "spent flakes". The defatted flakes may be ground to produce a soy flour. Although the process is yet to be employed with full fat soy flour, it is believed that full fat soy flour may also serve as a protein source. However, where full fat soy flour is processed, it is most likely necessary to use a separation step, such as three-stage centrifugation to remove oil. In yet another embodiment, the soy protein material may be soy flour, which has a protein content of about 49% to about 65% on a moisture-free basis. Alternatively, soy flour may be blended with soy protein isolate or soy protein concentrate.

Any fiber known in the art can be used as the fiber source in the application. Soy cotyledon fiber may optionally be utilized as a fiber source. Typically, suitable soy cotyledon fiber will generally effectively bind water when the mixture of soy protein and soy cotyledon fiber is extruded. In this context, "effectively bind water" generally means that the soy cotyledon fiber has a water holding capacity of at least 5.0 to about 8.0 grams of water per gram of soy cotyledon fiber, and preferably the soy cotyledon fiber has a water holding capacity of at least about 6.0 to about 8.0 grams of water per gram of soy cotyledon fiber. When present in the soy protein material, soy cotyledon fiber may generally be present in the soy protein material in an amount ranging from about 1% to about 20%, preferably from about 1.5% to about 20% and most preferably, at from about 2% to about 5% by weight on a moisture free basis. Suitable soy cotyledon fiber is commercially available. For example, FIBRIM® 1260 and FIBRIM® 2000 are soy cotyledon fiber materials that are commercially available from Solae, LLC (St. Louis, Mo.).

(ii) Animal Protein Materials

A variety of animal meats are suitable as a protein source. Animals from which the meat is obtained may be raised conventionally or organically. By way of example, meat and meat ingredients defined specifically for the various structured vegetable protein patents include intact or ground beef, pork, lamb, mutton, horsemeat, goat meat, meat, fat and skin of poultry (domestic fowl such as chicken, duck, goose or turkey) and more specifically flesh tissues from any fowl (any bird species), fish flesh derived from both fresh and salt water, animal flesh of shellfish and crustacean origin, animal flesh trim and animal tissues derived from processing such as frozen residue from sawing frozen fish, chicken, beef, pork etc., chicken skin, pork skin, fish skin, animal fats such as beef fat, pork fat, lamb fat, chicken fat, turkey fat, rendered animal fat such as lard and tallow, flavor enhanced animal fats, fractionated or further processed animal fat tissue, finely textured beef, finely textured pork, finely textured lamb, finely textured chicken, low temperature rendered animal tissues such as low temperature rendered beef and low temperature rendered pork, mechanically separated meat or mechanically deboned meat (MDM) (meat flesh removed from bone by various mechanical means) such as mechanically separated beef, mechanically separated pork, mechanically separated fish including surimi, mechanically separated chicken, mechanically separated turkey, any cooked animal flesh and organ meats derived from any animal species, and combinations thereof. Meat flesh should be extended to include muscle protein fractions derived from salt fractionation of the animal tissues, protein ingredients derived from isoelectric fractionation and precipitation of animal muscle or meat and hot boned meat as well as mechanically prepared collagen tissues and gelatin. Additionally, meat, fat, connective tissue and organ meats of game animals such as buffalo, deer, elk, moose, reindeer, caribou, antelope, rabbit, bear, squirrel, beaver, muskrat, opossum, raccoon, armadillo and porcupine as well as reptilian creatures such as snakes, turtles and lizards, and combinations thereof should be considered meat.

In a further embodiment, the animal meat may be from fish or seafood. Non-limiting examples of suitable fish include bass, carp, catfish, cobia, cod, grouper, flounder, haddock, hoki, perch, pollock, salmon, snapper, sole, trout, tuna, whitefish, whiting, tilapia, and combinations thereof. Non-limiting examples of seafood include scallops, shrimp, lobster, clams, crabs, mussels, oysters, and combinations thereof.

It is also envisioned that a variety of meat qualities may be utilized in the invention. The meat may comprise muscle tissue, organ tissue, connective tissue, skin, and combinations thereof. The meat may be any meat suitable for human consumption. The meat may be non-rendered, non-dried, raw meat, raw meat products, raw meat by-products, and mixtures thereof. For example, whole meat muscle that is either ground or in chunk or steak form may be utilized. In another embodiment, the meat may be mechanically deboned or separated raw meats using high-pressure machinery that separates bone from animal tissue, by first crushing bone and adhering animal tissue and then forcing the animal tissue, and not the bone, through a sieve or similar screening device. The process forms an unstructured, paste-like blend of soft animal tissue with a batter-like consistency and is commonly referred to as mechanically deboned meat or MDM. In an additional embodiment, seafood meat can be obtained through typical MDM processes or any method known in the art for separating seafood meat, such as fish or shellfish from bones or shells. Alternatively, the meat may be a meat by-product. In the context of the present invention, the term "meat by-products" is intended to refer to those non-rendered parts of the carcass of slaughtered animals, fish, and shellfish. Examples of meat by-products are organs and tissues such as lungs, spleens, kidneys, brain, liver, blood, bone, partially defatted low-temperature fatty tissues, stomachs, intestines free of their contents, and the like.

The protein source may also be an animal derived protein other than animal tissue. For example, the protein-containing material may be derived from a dairy product. Suitable dairy protein products include non-fat dried milk powder, whole milk powder, milk protein isolate, milk protein concentrate, casein protein isolate, casein protein concentrate, caseinates, whey protein isolate, whey protein concentrate, and combinations thereof. The milk protein-containing material may be derived from cows, goats, sheep, donkeys, camels, camelids, yaks, or water buffalos. In an exemplary embodiment, the dairy protein is whey protein.

By way of further example, a protein-containing material may also be from an egg product. Suitable egg protein products include powdered egg, dried egg solids, dried egg white protein, liquid egg white protein, egg white protein powder, isolated ovalbumin protein, and combinations thereof. Examples of suitable isolated egg proteins include ovalbumin, ovoglobulin, ovomucin, ovomucoid, ovotransferrin, ovovitella, ovovitellin, albumin globulin, vitellin, and combinations thereof. Egg protein products may be derived from the eggs of chicken, duck, goose, quail, or other birds.

(iii) Combinations of Protein-Containing Materials

Non-limiting combinations of protein-containing materials isolated from a variety of sources are detailed in Table A. In one embodiment, the protein-containing material is derived from soybeans. In a preferred embodiment, the protein-containing material comprises a mixture of materials derived from soybeans and wheat. In another preferred embodiment, the protein-containing material comprises a mixture of materials derived from soybeans and canola. In still another preferred embodiment, the protein-containing material comprises a mixture of materials derived from soybeans, wheat, and dairy, wherein the dairy protein is whey.

TABLE A

Protein Material Combinations

| First protein ingredient | Second protein ingredient |
|---|---|
| soybean | wheat |
| soybean | canola |
| soybean | corn |
| soybean | lupin |
| soybean | oat |
| soybean | pea |
| soybean | rice |
| soybean | sorghum |
| soybean | amaranth |
| soybean | arrowroot |
| soybean | barley |
| soybean | buckwheat |
| soybean | cassava |
| soybean | channa (garbanzo) |
| soybean | millet |
| soybean | peanut |
| soybean | potato |
| soybean | rye |
| soybean | sunflower |
| soybean | tapioca |
| soybean | triticale |
| soybean | dairy |
| soybean | whey |
| soybean | egg |
| soybean | wheat and canola |
| soybean | wheat and corn |
| soybean | wheat and lupin |
| soybean | wheat and oat |
| soybean | wheat and pea |
| soybean | wheat and rice |
| soybean | wheat and sorghum |
| soybean | wheat and amaranth |
| soybean | wheat and arrowroot |
| soybean | wheat and barley |
| soybean | wheat and buckwheat |
| soybean | wheat and cassava |
| soybean | wheat and channa (garbanzo) |
| soybean | wheat and millet |
| soybean | wheat and peanut |
| soybean | wheat and rye |
| soybean | wheat and potato |
| soybean | wheat and sunflower |
| soybean | wheat and tapioca |
| soybean | wheat and triticale |
| soybean | wheat and dairy |
| soybean | wheat and whey |
| soybean | wheat and egg |
| soybean | canola and corn |
| soybean | canola and lupin |
| soybean | canola and oat |
| soybean | canola and pea |
| soybean | canola and rice |
| soybean | canola and sorghum |
| soybean | canola and amaranth |
| soybean | canola and arrowroot |
| soybean | canola and barley |
| soybean | canola and buckwheat |
| soybean | canola and cassava |
| soybean | canola and channa (garbanzo) |
| soybean | canola and millet |
| soybean | canola and peanut |
| soybean | canola and rye |
| soybean | canola and potato |
| soybean | canola and sunflower |
| soybean | canola and tapioca |
| soybean | canola and triticale |
| soybean | canola and dairy |
| soybean | canola and whey |
| soybean | canola and egg |
| soybean | corn and lupin |
| soybean | corn and oat |
| soybean | corn and pea |
| soybean | corn and rice |
| soybean | corn and sorghum |
| soybean | corn and amaranth |
| soybean | corn and arrowroot |

TABLE A-continued

Protein Material Combinations

| First protein ingredient | Second protein ingredient |
| --- | --- |
| soybean | corn and barley |
| soybean | corn and buckwheat |
| soybean | corn and cassava |
| soybean | corn and channa (garbanzo) |
| soybean | corn and millet |
| soybean | corn and peanut |
| soybean | corn and rye |
| soybean | corn and potato |
| soybean | corn and sunflower |
| soybean | corn and tapioca |
| soybean | corn and triticale |
| soybean | corn and dairy |
| soybean | corn and whey |
| soybean | corn and egg |

(b) Colorants

The colored structured protein product also comprises at least one colorant. As described more fully in II(b) and II(c), the colorant(s) may be combined with the protein-containing material and other ingredients prior to being fed into the extruder. In an alternative embodiment, the colorant(s) may be combined with the protein-containing material and other ingredients after being fed into the extruder. In the presence of the heat or the heat and pressure utilized during the extrusion process, some combinations of colorants and protein-containing materials result in unexpected colors. As an example, when carmine (soluble dye or lake) is contacted with the protein-containing material during the extrusion process, the color changes from red to violet/purple.

The colorant(s) may be a natural colorant, a combination of natural colorants, an artificial colorant, a combination of artificial colorants, or a combination of natural and artificial colorants. Suitable examples of natural colorants approved for use in food include annatto (reddish-orange), anthocyanins (red to blue, depends upon pH), beet juice, beta-carotene (orange), beta-APO 8 carotenal (orange), black currant, burnt sugar; canthaxanthin (pink-red), caramel, carmine/carminic acid (bright red), cochineal extract (red), curcumin (yellow-orange); lac (scarlet red), lutein (red-orange); lycopene (orange-red), mixed carotenoids (orange), monascus (red-purple, from fermented red rice), paprika, red cabbage juice, riboflavin (yellow), saffron, titanium dioxide (white), turmeric (yellow-orange), and combinations thereof. Suitable examples of artificial colorants approved for food use in the United States include FD&C Red No. 3 (Erythrosine), FD&C Red No. 40 (Allura Red), FD&C Yellow No. 5 (Tartrazine), FD&C Yellow No. 6 (Sunset Yellow FCF), FD&C Blue No. 1 (Brilliant Blue), FD&C Blue No. 2 (Indigotine), and combinations thereof. Artificial colorants that may be used in other countries include Cl Food Red 3 (Carmoisine), Cl Food Red 7 (Ponceau 4R), Cl Food Red 9 (Amaranth), Cl Food Yellow 13 (Quinoline Yellow), Cl Food Blue 5 (Patent Blue V), and combinations thereof. Food colorants may be dyes, which are powders, granules, or liquids that are soluble in water. Alternatively, natural and artificial food colorants may be lake colors, which are combinations of dyes and insoluble materials. Lake colors are not oil soluble, but are oil dispersible; tinting by dispersion.

Suitable colorant(s) may be combined with the protein-containing materials in a variety of forms. Non-limiting examples include solid, semi-solid, powdered, liquid, gelatin, and combinations thereof. The type and concentration of colorant(s) utilized may vary depending on the protein-containing materials used and the desired color of the colored structured protein product. Typically, the concentration of colorant(s) may range from about 0.001% to about 5.0% by weight. In one embodiment, the concentration of colorant(s) may range from about 0.01% to about 4.0% by weight. In another embodiment, the concentration of colorant(s) may range from about 0.05% to about 3.0% by weight. In still another embodiment, the concentration of colorant(s) may range from about 0.1% to about 3.0% by weight. In a further embodiment, the concentration of colorant(s) may range from about 0.5% to about 2.0% by weight. In another embodiment, the concentration of colorant(s) may range from about 0.75% to about 1.0% by weight.

The protein-containing materials may further comprise a pH regulator to maintain the pH in the optimal range for the colorant(s) utilized. The pH regulator may be an acidulent. Examples of acidulents that may be added to food include citric acid, acetic acid (vinegar), tartaric acid, malic acid, fumaric acid, lactic acid, phosphoric acid, sorbic acid, benzoic acid, and combinations thereof. The concentration of the pH regulator utilized may vary depending on the protein-containing materials and the colorant used. Typically, the concentration of pH regulator may range from about 0.001% to about 5.0% by weight. In one embodiment, the concentration of pH regulator may range from about 0.01% to about 4.0% by weight. In another embodiment, the concentration of pH regulator may range from about 0.05% to about 3.0% by weight. In still another embodiment, the concentration of pH regulator may range from about 0.1% to about 3.0% by weight. In a further embodiment, the concentration of pH regulator may range from about 0.5% to about 2.0% by weight. In another embodiment, the concentration of pH regulator may range from about 0.75% to about 1.0% by weight. In an alternative embodiment, the pH regulator may be a pH-raising agent, such as disodium diphosphate.

(c) Additional Ingredients (i) Carbohydrates

It is envisioned that other ingredient additives in addition to proteins may be utilized in the colored structured protein products. Non-limiting examples of such ingredients include sugars, starches, oligosaccharides, and dietary fibers. As an example, starches may be derived from wheat, corn, tapioca, potato, rice, and the like. A suitable fiber source may be soy cotyledon fiber. Typically, suitable soy cotyledon fiber will generally effectively bind water when the mixture of soy protein and soy cotyledon fiber is co-extruded. In this context, "effectively bind water" generally means that the soy cotyledon fiber has a water holding capacity of at least 5.0 to about 8.0 grams of water per gram of soy cotyledon fiber, and preferably the soy cotyledon fiber has a water holding capacity of at least about 6.0 to about 8.0 grams of water per gram of soy cotyledon fiber. Soy cotyledon fiber may generally be present in the soy protein material in an amount ranging from about 1% to about 20% by weight on a moisture free basis, preferably from about 1.5% to about 20% by weight on a moisture free basis, and most preferably, at from about 2% to about 5% by weight on a moisture free basis. Suitable soy cotyledon fiber is commercially available. For example, FIBRIM® 1260 and FIBRIM® 2000 are soy cotyledon fiber materials that are commercially available from Solae, LLC (St. Louis, Mo.).

In each of the embodiments delineated in Table A, the combination of protein-containing materials may be combined with one or more ingredients selected from the group consisting of a starch, flour, gluten, dietary fiber, and mixtures thereof. In one embodiment, the protein-containing material comprises protein, starch, gluten, and fiber. In an exemplary embodiment, the protein-containing material comprises from about 45% to about 65% soy protein on a dry matter basis; from about 20% to about 30% wheat gluten on a dry matter basis; from about 10% to about 15% wheat starch on a dry matter basis; and from about 1% to about 5% fiber on a dry matter basis. In each of the foregoing embodiments, the protein-containing material may comprise dicalcium phosphate, L-cysteine and combinations of both dicalcium phosphate and L-cysteine.

(ii) pH-Adjusting Agent

In some embodiments, it may be desirable to adjust the pH of the protein-containing material to an acidic pH (i.e., below approximately 7.0). Thus, the protein-containing material may be contacted with a pH-lowering agent, and the mixture is then extruded according to the process detailed below. In one embodiment, the pH of the protein-containing material to be extruded may range from about 6.0 to about 7.0. In another embodiment, the pH may range from about 5.0 to about 6.0. In an alternate embodiment, the pH may range from about 4.0 to about 5.0. In yet another embodiment, the pH of the material may be less than about 4.0.

Several pH-lowering agents are suitable for use in the invention. The pH-lowering agent may be organic. Alternatively, the pH-lowering agent may be inorganic. In exemplary embodiments, the pH-lowering agent is a food grade edible acid. Non-limiting acids suitable for use in the invention include acetic, lactic, hydrochloric, phosphoric, citric, tartaric, malic, and combinations thereof. In an exemplary embodiment, the pH-lowering agent is lactic acid.

As will be appreciated by a skilled artisan, the amount of pH-lowering agent contacted with the protein-containing material can and will vary depending upon several parameters, including, the agent selected and the desired pH. In one embodiment, the amount of pH-lowering agent may range from about 0.1% to about 15% on a dry matter basis. In another embodiment, the amount of pH-lowering agent may range from about 0.5% to about 10% on a dry matter basis. In an alternate embodiment, the amount of pH-lowering agent may range from about 1% to about 5% on a dry matter basis. In still another embodiment, the amount of pH-lowering agent may range from about 2% to about 3% on a dry matter basis.

In some embodiments, it may be desirable to raise the pH of the protein-containing material. Thus, the protein-containing material may be contacted with a pH-raising agent, and the mixture is then extruded according to the process detailed below.

(iii) Antioxidants

One or more antioxidants may be added to any of the combinations of protein-containing materials mentioned above without departing from the scope of the invention. Antioxidants may be included to increase the shelf-life or nutritionally enhance the structured protein products. Non-limiting examples of suitable antioxidants include BHA, BHT, TBHQ, vitamins A, C, and E and derivatives, various plant extracts, such as those containing carotenoids, tocopherols, or flavonoids having antioxidant properties, and combinations thereof. The antioxidants may have a combined presence at levels of from about 0.01% to about 10%, preferably, from about 0.05% to about 5%, and more preferably from about 0.1% to about 2%, by weight of the protein-containing materials that will be extruded.

(iv) Minerals and Amino Acids

The protein-containing material may also optionally comprise supplemental minerals. Suitable minerals may include one or more minerals or mineral sources. Non-limiting examples of minerals include, without limitation, chloride, sodium, calcium, iron, chromium, copper, iodine, zinc, magnesium, manganese, molybdenum, phosphorus, potassium, selenium, and combinations thereof. Suitable forms of any of the foregoing minerals include soluble mineral salts, slightly soluble mineral salts, insoluble mineral salts, chelated minerals, mineral complexes, non-reactive minerals such as carbonate minerals, reduced minerals, and combinations thereof.

Free amino acids may also be included in the protein-containing material. Suitable amino acids include the essential amino acids, i.e., arginine, cysteine, histidine, isoleucine, leucine, lysine, methionine, phenylalanine, threonine, tyrosine, tryptophan, valine, and combinations thereof. Suitable forms of the amino acids include salts and chelates.

II. Process for Producing the Colored Structured Protein Product

The colored structured protein products of the invention are made by extruding protein-containing material through a die assembly under conditions of elevated temperature and pressure. Typically, the protein-containing material may be combined with at least one colorant before it is put in the extruder. Alternatively, the protein-containing material may be combined with at least one colorant after it is put in the extruder. In a further example, the protein-containing material may be combined with at least one colorant after exiting the extruder. After extrusion, the resulting colored structured protein product comprises protein fibers that are substantially aligned.

(a) Moisture Content

As will be appreciated by the skilled artisan, the moisture content of the protein-containing materials can and will vary depending upon the extrusion process. Generally speaking, the moisture content may range from about 1% to about 80% by weight. In low moisture extrusion applications, the moisture content of the protein-containing materials may range from about 1% to about 35% by weight. Alternatively, in high moisture extrusion applications, the moisture content of the protein-containing materials may range from about 35% to about 80% by weight. In an exemplary embodiment, the extrusion application utilized to form the extrudates is low moisture. An exemplary example of a low moisture extrusion process to produce colored structured protein products having protein fibers that are substantially aligned is detailed below in II(c) and Example 3.

(b) Coloring

The colored structured protein products of the invention are made by extruding protein-containing material through a die assembly under conditions of elevated temperature and pressure. Generally, at least one colorant may be combined with the protein-containing material either prior to or during the extrusion process. Suitable colorants are detailed in I(b) above. As described more fully below, the colorant(s) may be combined with the protein-containing material prior to its introduction into the extruder. In one embodiment, the colorant(s) may be combined with the protein-containing material and other ingredients forming a colored pre-mix. In another embodiment, the colorant(s) may be combined with the protein-containing material and other ingredients, including a conditioner, forming a conditioned colored pre-mix. In still another embodiment, the colorant(s) may be combined with the protein-containing material after it has entered the extruder. In an alternative to this embodiment, the colorant(s) may be injected into the extruder barrel during the extrusion process. The type and concentration of colorant(s) utilized may vary depending on the protein-containing materials used, the desired color of the colored structured protein product, and the point of the process the colorant(s) is introduced. Regardless of the point at which the protein-containing material and the colorant(s) are combined, the concentration of colorant(s) generally range from about 0.001% to about 5.0% by weight. In one embodiment, the concentration of colorant(s) may range from about 0.01% to about 4.0% by weight. In another embodiment, the concentration of colorant (s) may range from about 0.05% to about 3.0% by weight. In still another embodiment, the concentration of colorant(s) may range from about 0.1% to about 3.0% by weight. In a further embodiment, the concentration of colorant(s) may range from about 0.5% to about 2.0% by weight. In another embodiment, the concentration of colorant(s) may range from about 0.75% to about 1.0% by weight.

(c) Extrusion

A suitable extrusion process for the preparation of a colored structured protein product comprises introducing the protein-containing material and other ingredients into a mixing tank (i.e., an ingredient blender) to combine the ingredients and form a blended protein material pre-mix. In one embodiment, the blended protein material pre-mix may be combined with at least one colorant. The blended protein material pre-mix may then be transferred to a hopper from which the blended ingredients may be introduced along with moisture into the extruder. In another embodiment, the blended protein material pre-mix may be combined with a conditioner to form a conditioned protein material mixture. In an alternative embodiment, at least one colorant may be combined with the conditioner forming a colored conditioned protein material mixture. The conditioned material may then be fed into an extruder in which the protein material mixture is heated under mechanical pressure generated by the screws of the extruder to form a colored molten extrusion mass. In an exemplary embodiment, at least one colorant may be injected into the extruder barrel via one or more injection jets. The colored extrudate exits the extruder through an extrusion die and comprises protein fibers that are substantially aligned.

(i) Extrusion Process Conditions

Among the suitable extrusion apparatuses useful in the practice of the present invention is a double barrel, twin-screw extruder as described, for example, in U.S. Pat. No. 4,600,311. Further examples of suitable commercially available extrusion apparatuses include a CLEXTRAL® Model BC-72 extruder manufactured by Clextral, Inc. (Tampa, Fla.); a WENGER Model TX-57 extruder, a WENGER Model TX-168 extruder, and a WENGER Model TX-52 extruder all manufactured by Wenger Manufacturing, Inc. (Sabetha, Kans.). Other conventional extruders suitable for use in this invention are described, for example, in U.S. Pat. Nos. 4,763,569, 4,118,164, and 3,117,006, which are hereby incorporated by reference in their entirety.

A single-screw extruder could also be used in the present invention. Examples of suitable, commercially available single-screw extrusion apparatuses include the WENGER Model X-175, the WENGER Model X-165, and the WENGER Model X-85, all of which are available from Wenger Manufacturing, Inc.

The screws of a twin-screw extruder can rotate within the barrel in the same or opposite directions. Rotation of the screws in the same direction is referred to as single flow whereas rotation of the screws in opposite directions is referred to as double flow or counter rotating. The speed of the screw or screws of the extruder may vary depending on the particular apparatus, however, it is typically from about 250 to about 450 revolutions per minute (rpm). Generally, as the screw speed increases, the density of the extrudate will decrease. The extrusion apparatus contains screws assembled from shafts and worm segments, as well as mixing lobe and ring-type shearlock elements to increase mixing and shearing as recommended by the extrusion apparatus manufacturer for extruding plant protein material.

The extrusion apparatus generally comprises a plurality of heating zones through which the protein mixture is conveyed under mechanical pressure prior to exiting the extrusion apparatus through an extrusion die. The temperature in each successive heating zone generally exceeds the temperature of the previous heating zone by between about 10° C. and about 70° C. In one embodiment, the conditioned pre-mix is transferred through four heating zones within the extrusion apparatus, with the protein mixture heated to a temperature of from about 100° C. to about 150° C. such that the molten extrusion mass enters the extrusion die at a temperature of from about 100° C. to about 150° C. One skilled in the art could adjust the temperature either heating or cooling to achieve the desired properties. Typically, temperature changes are due to work input and can happen suddenly.

The pressure within the extruder barrel is typically between about 50 psig to about 500 psig preferably between about 75 psig to about 200 psig. Generally, the pressure within the last two heating zones is from about 100 psig to about 3000 psig preferably between about 150 psig to about 500 psig. The barrel pressure is dependent on numerous factors including, for example, the extruder screw speed, feed rate of the mixture to the barrel, feed rate of water to the barrel, and the viscosity of the molten mass within the barrel, extruder barrel temperatures and die design.

Water may be injected into the extruder barrel to hydrate the protein material mixture and promote texturization of the proteins. As an aid in forming the molten extrusion mass, the water may act as a plasticizing agent. Water may be introduced to the extruder barrel via one or more injection jets in communication with a heating zone. In one embodiment, the water may be combined with at least one colorant and injected into the extruder barrel to color the protein material mixture. Typically, the mixture in the barrel contains from about 1% to about 35% by weight water. In one embodiment, the mixture in the barrel contains from about 5% to about 20% by weight water. The rate of introduction of water to any of the heating zones is generally controlled to promote production of an extrudate having desired characteristics. It has been observed that as the rate of introduction of water to the barrel decreases, the density of the extrudate decreases. Typically, less than about 1 kg of water per kg of protein is introduced to the barrel. Preferably, from about 0.1 kg to about 1 kg of water per kg of protein are introduced to the barrel.

(ii) Optional Preconditioning

In a pre-conditioner, the protein-containing material and optional additional ingredients (protein-containing mixture) are preheated, contacted with moisture, and held under controlled temperature and pressure conditions to allow the moisture to penetrate and soften the individual particles. In one embodiment, the protein-containing material and optional additional ingredients may be combined with at least one colorant. The preconditioning step increases the bulk density of the particulate fibrous material mixture and improves its flow characteristics. The preconditioner contains one or more shafts with paddles to promote uniform mixing of the protein and transfer of the protein mixture through the preconditioner. The configuration and rotational speed of the paddles vary widely, depending on the capacity and length of the preconditioner, the extruder throughput and/or the desired residence time of the mixture in the preconditioner or extruder barrel. Generally, the speed of the paddles is from about 100 to about 1300 revolutions per minute (rpm). Agitation must be high enough to obtain even hydration and good mixing.

Typically, the protein-containing mixture is pre-conditioned prior to introduction into the extrusion apparatus by contacting the pre-mix with moisture (i.e., steam and/or water). In one embodiment, the pre-mix is combined with moisture and at least one colorant. Preferably the protein-containing mixture is heated to a temperature of from about 25° C. to about 80° C., more preferably from about 30° C. to about 40° C. in the preconditioner.

Typically, the protein-containing pre-mix is conditioned for a period of about 0.5 minutes to about 10.0 minutes, depending on the speed and the size of the pre-conditioner. In an exemplary embodiment, the protein-containing pre-mix is conditioned for a period of about 3.0 minutes to about 5.0 minutes. In a further example, the period for conditioning is about 30 seconds to about 60 seconds. The pre-mix is contacted with steam and/or water and heated in the pre-conditioner at generally constant steam flow to achieve the desired temperatures. The water and/or steam conditions (i.e., hydrates) the pre-mix, increases its density, and facilitates the flowability of the dried mix without interference prior to introduction to the extruder barrel where the proteins are texturized. If low moisture pre-mix is desired, the conditioned pre-mix may contain from about 1% to about 35% (by weight) water. If high moisture pre-mix is desired, the conditioned pre-mix may contain from about 35% to about 80% (by weight) water.

The conditioned pre-mix typically has a bulk density of from about 0.25 g/cm$^3$ to about 0.60 g/cm$^3$. Generally, as the bulk density of the pre-conditioned protein mixture increases within this range, the protein mixture is easier to process. This is presently believed to be due to such mixtures occupying all or a majority of the space between the screws of the extruder, thereby facilitating conveying the extrusion mass through the barrel. It also improves the efficiency to generate more shear and pressure to texturize the molten and the extrusion mass.

(iii) Extrusion Process

The dry pre-mix or the conditioned pre-mix is then fed into an extruder to heat, shear, and ultimately plasticize the mixture. The extruder may be selected from any commercially available extruder and may be a single screw extruder or preferably a twin-screw extruder that mechanically shears the mixture with the screw elements.

The rate at which the pre-mix is generally introduced to the extrusion apparatus will vary depending upon the particular apparatus size and model. Generally, the pre-mix is introduced at a rate of no more than about 75 kilograms per minute. Generally, it has been observed that the density of the extrudate decreases as the feed rate of pre-mix to the extruder increases. Whatever extruder is used, it should be run in excess of about 50% motor load. The rate at which the pre-mix is generally introduced to the extrusion apparatus will vary depending upon the particular apparatus. Typically, the conditioned pre-mix is introduced to the extrusion apparatus at a rate of between about 16 kilograms per minute to about 60 kilograms per minute. In another embodiment, the conditioned pre-mix is introduced to the extrusion apparatus at a rate between 20 kilograms per minute to about 40 kilograms per minute. The conditioned pre-mix is introduced to the extrusion apparatus at a rate of between about 26 kilograms per minute to about 32 kilograms per minute. Generally, it has been observed that the density of the extrudate decreases as the feed rate of pre-mix to the extruder increases.

The pre-mix is subjected to shear and pressure by the extruder to plasticize the mixture. The extruder screw elements shear the mixture as well as generate pressure by forcing the mixture throughout the extruder barrel and die assembly. The screw speed determines the amount of shear and pressure applied to the mixture. Preferably, the screw speed is set from about 200 rpm to about 500 rpm, and more preferably from about 300 rpm to about 450 rpm, which moves the mixture through the extruder at a rate of at least about 20 kilograms per minute, and more preferably at least about 40 kilograms per minute. Preferably the extruder generates an extruder head pressure of from about 500 to about 3000 psig, and more preferably an extruder head pressure of from about 600 to about 1000 psig.

The extruder heats the mixture as it passes through the extruder further denaturing the protein in the mixture. Passing through the extruder the denatured protein is restructured or reconfigured to produce a structured protein material with protein fibers substantially aligned. The extruder includes a means for heating the mixture to temperatures of from about 100° C. to about 180° C. Preferably the means for heating the mixture in the extruder comprises extruder barrel jackets into which heating or cooling media such as steam or water may be introduced to control the temperature of the mixture passing through the extruder. The extruder also includes steam injection ports for directly injecting steam into the mixture within the extruder. The extruder may also include colorant injection ports for directly injecting colorant into the mixture within the extruder. The extruder preferably includes multiple heating zones that can be controlled to independent temperatures, where the temperatures of the heating zones are preferably set to increase the temperature of the mixture as it proceeds through the extruder. In one embodiment, the extruder may be set in a four temperature zone arrangement, where the first zone (adjacent the extruder inlet port) is set to a temperature of from about 50° C. to about 80° C., the second zone is set to a temperature of from about 80° C. to 100° C., the third zone is set to a temperature of from 100° C. to about 130° C., and the fourth zone (adjacent the extruder exit port) is set to a temperature of from 130° C. to 150° C. The extruder may be set in other temperature zone arrangements, as desired. In another embodiment, the extruder may be set in a five temperature zone arrangement, where the first zone is set to a temperature of about 25° C., the second zone is set to a temperature of about 50° C., the third zone is set to a temperature of about 95° C., the fourth zone is set to a temperature of about 130° C., and the fifth zone is set to a temperature of about 150° C. In still another embodiment, the extruder may be set in a six temperature zone arrangement, where the first zone is set to a temperature of about 90° C., the second zone is set to a temperature of about 100° C., the third zone is set to a temperature of about 105° C., the fourth zone is set to a temperature of about 100° C., the fifth zone is set to a temperature of about 120° C., and the sixth zone is set to a temperature of about 130° C.

The mixture forms a melted colored plasticized mass in the extruder. A die assembly is attached to the extruder in an arrangement that permits the colored plasticized mixture to flow from the extruder exit port into the die assembly and produces substantial alignment of the protein fibers within the colored plasticized mixture as it flows through the die assembly. The die assembly may include either a faceplate die or a peripheral die.

The width and height dimensions of the die aperture(s) are selected and set prior to extrusion of the mixture to provide the fibrous material extrudate with the desired dimensions. The width of the die aperture(s) may be set so that the extrudate resembles from a cubic chunk of meat to a steak filet, where widening the width of the die aperture(s) decreases the cubic chunk-like nature of the extrudate and increases the filet-like nature of the extrudate. Preferably the width of the die aperture(s) is/are set to a width of from about 5 millimeters to about 40 millimeters.

The height dimension of the die aperture(s) may be set to provide the desired thickness of the extrudate. The height of the aperture(s) may be set to provide a very thin extrudate or a thick extrudate. Preferably, the height of the die aperture(s) may be set to from about 1 millimeter to about 30 millimeters, and more preferably from about 8 millimeters to about 16 millimeters.

It is also contemplated that the die aperture(s) may be round. The diameter of the die aperture(s) may be set to provide the desired thickness of the extrudate. The diameter of the aperture(s) may be set to provide a very thin extrudate or a thick extrudate. Preferably, the diameter of the die aperture(s) may be set to from about 1 millimeter to about 30 millimeters, and more preferably from about 8 millimeters to about 16 millimeters.

Figure 3:
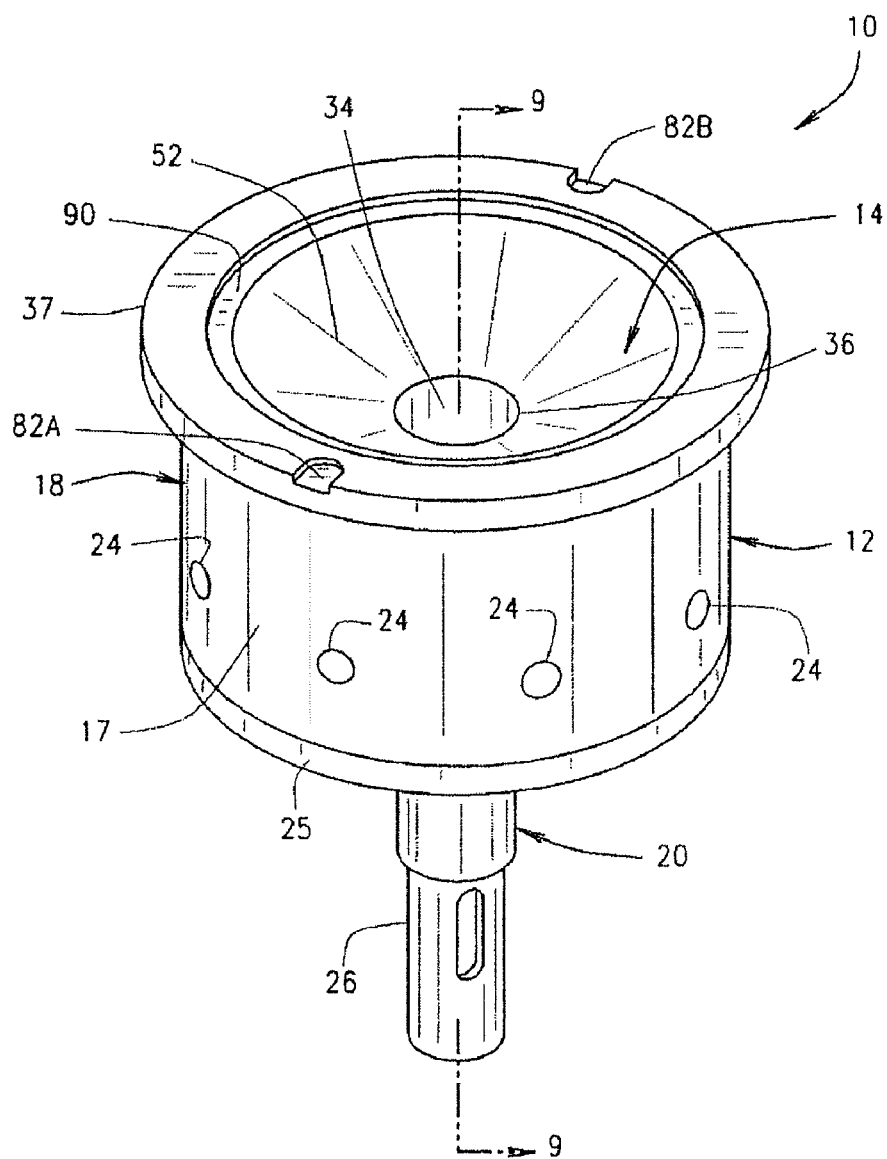
FIG. 3 depicts a perspective view of one embodiment of the peripheral die assembly that may be used in the extrusion process of the protein containing materials.

Referring to the drawings (FIGS. 3-8), one embodiment of the peripheral die assembly is illustrated and generally indicated as 10 in FIG. 3. The peripheral die assembly 10 may be used in an extrusion process for extruding an extrusion, such as a plant protein-water mixture, in a manner that causes substantial parallel alignment of the protein fibers of the extrusion as shall be discussed in greater detail below. In the alternative, the extrusion may be made from a meat and/or plant protein-water mixture.

Figure 4:
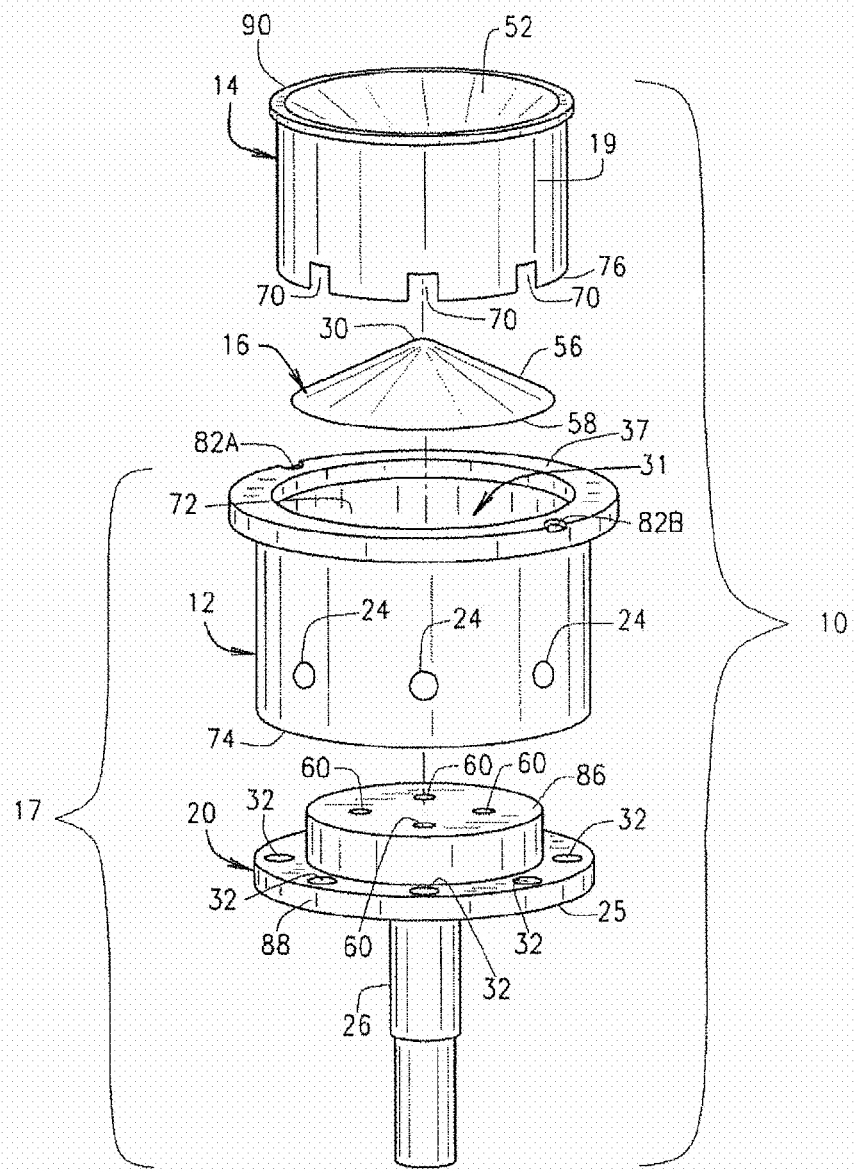
FIG. 4 depicts an exploded view of the peripheral die assembly showing the die insert, die sleeve, and die cone.

As shown in FIGS. 3 and 4, the peripheral die assembly 10 may include a die sleeve 12 having a cylindrical-shaped two-part sleeve die body 17. The sleeve die body 17 may include a rear portion 18 coupled to an end plate 20 that collectively define an internal area 31 in communication with opposing openings 72, 74. The die sleeve 12 may be adapted to receive a die insert 14 and a die cone 16 for providing the necessary structural elements to facilitate substantially parallel flow of the extrusion through the peripheral die assembly 10 during the extrusion process.

In one embodiment, the end plate 20 of the die sleeve 12 may be secured to a die cone 16 adapted to interface with the die insert 14 when the end plate 20 is secured to the rear portion 18 of the die sleeve 12 during assembly of the peripheral die assembly 10. As further shown, the rear portion 18 of die sleeve 12 defines a plurality of circular-shaped outlets 24 along the sleeve body 17 which are adapted to provide a conduit for the egress of extrusion from the peripheral die assembly 10 during the extrusion process. In the alternative, the plurality of outlets 24 may have different configurations, such as square, rectangular, scalloped or irregular. As further shown, the rear portion 18 of the die sleeve 12 may include a circular flange 37 that surrounds opening 72 and defines a pair of opposing slots 82A and 82B that are used to properly align the die sleeve 12 when engaging the die sleeve 12 to the extruding apparatus (not shown).

Referring to FIGS. 3-8, one embodiment of the die insert 14 may include a cylindrical-shaped die insert body 19 having a front face 27 in communication with an opposing rear face 29 through a throat 34 defined between the rear and front faces 27, 29. The front face 27 of the die insert 14 may define a slanted bottom portion 64 in communication with a plurality of raised flow diverters 38 that are spaced circumferentially around the front face 27 of the die insert body 19 and which surrounds an inner space 44 that communicates with throat 34. In one embodiment, the flow diverters 38 may have a pie-shaped configuration, although other embodiments may have other configurations adapted to divert and funnel the flow of the extrusion through the outlets 24 of the peripheral die assembly 10. In addition, the front face 27 of the die insert 14 defines a plurality of openings 70 adapted to communicate with a respective outlet 24 with the openings 70 being circumferentially spaced around the peripheral edge of the die insert 14.

Figure 7:
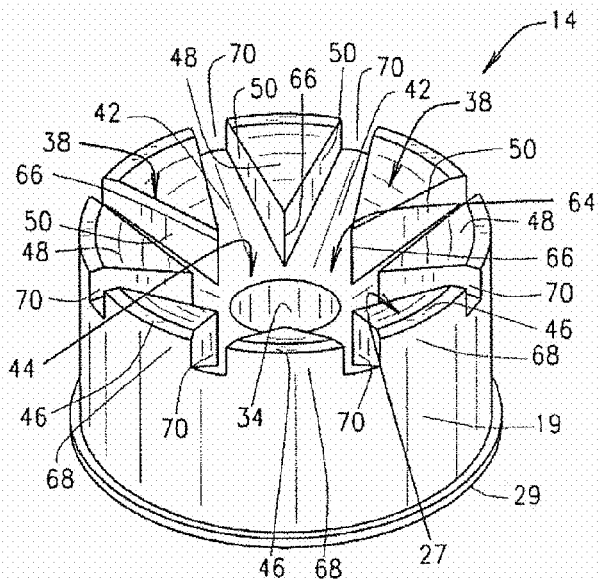
FIG. 7 depicts a perspective view of the die insert.

Referring to FIGS. 3, 4, and 7 the throat 34 defined between the rear and front faces 27, 29 of the die insert 14 communicates with an opening 36 (FIG. 5) which is in communication with a well 52 defined along the rear face 29 of die insert body 19. In one embodiment, the well 52 (FIGS. 5 and 6) has a generally bowl-shaped configuration surrounded by a flange 90 (FIG. 5). The well 52 may be adapted to permit the extrusion to enter the throat 34 and flow into the inner space 44 (FIG. 7) through opening 36 (FIGS. 5 and 6) having substantially parallel flow as the extrusion enters the die insert 14 from an extrusion apparatus (not shown). In other embodiments, the well 52 may be sized and shaped to different configurations suitable for permitting substantially parallel flow of the extrusion through the throat 34 as the extrusion enters the front face 29 of the die insert 14.

Figure 8:
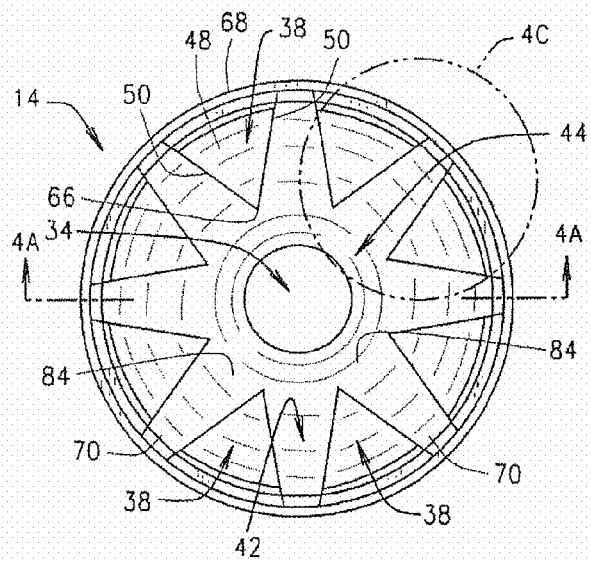
FIG. 8 depicts a top view of the die insert.

As shown specifically in FIGS. 7 and 8, each flow diverter 38 has a raised configuration defining a curved back portion 68 having a beveled peripheral edge 46 in communication with opposing side walls 50 that meet at an apex 66. In addition, each flow diverter 38 defines a pie-shaped surface 48 adapted to interface with die cone 16 (FIG. 4). As further shown, the opposing side walls 50 of adjacent flow diverters 38 and the bottom portion 64 of the die insert 14 collectively define a tapered flow pathway 42 that forms a portion of a flow channel 40 (FIG. 5) when the peripheral die assembly 10 is fully assembled. The flow pathway 42 may be in communication with an entrance 84 at one end and a respective outlet 24 (FIGS. 3, 4, and 5) at a terminal end of the flow pathway 42.

As further shown, each flow pathway 42 has a three-sided tapered configuration collectively defined between the opposing side walls 50 of adjacent flow diverters 38 and the slanted configuration of bottom portion 64 of the die insert 14. In one embodiment, this three-sided tapered configuration gradually tapers inwardly on all three sides of the flow pathway 42 from the entrance 84 to the outlet 24.

In an embodiment, the front face 27 of the die insert 14 may include eight flow diverters 38 that define a respective flow pathway 42 between adjacent flow diverters 38 for a total of eight flow pathways 42. However, other embodiments may define at least two or more flow diverters 38 circumferentially spaced around the peripheral edge of the 76 (FIG. 4) of the die insert 14 in order to provide at least two or more flow pathways 42 along the front face 27 of the die insert 14.

During the extrusion process, as shown in FIGS. 5, 6, 7, and 8, the peripheral die assembly 10 may be operatively engaged with an extruding apparatus (not shown) that produces an extrusion that contacts the well 52 defined by the rear face 29 of the die insert 14 and flows into the throat 34 and enters the inner space opening 36 as indicated by flow path A. The extrusion may enter the inner space 44 defined by the die insert 14 and enter the entrance 84 of each tapered flow channel 42. As noted above, the extrusion then flows through each flow channel 42 and exits from a respective outlet 24 in a manner that causes the substantial alignment of the plant protein fibers in the extrusion produced by the peripheral die assembly 10.

Examples of peripheral die assemblies suitable for use in this invention to produce the structured protein fibers that are substantially aligned are described in U.S. Pat. App. No. 60/882,662, and U.S. patent application Ser. No. 11/964,538, which are hereby incorporated by reference in their entirety.

The extrudate may be cut after exiting the die assembly. Suitable apparatuses for cutting the extrudate include flexible knives for face die cutting and hard blades for peripheral cutting manufactured by Wenger Manufacturing, Inc. (Sabetha, Kans.) and Clextral, Inc. (Tampa, Fla.). Typically, the speed of the cutting apparatus is from about 100 rpm to about 1500 rpm. In an exemplary embodiment, the speed of the cutting apparatus is about 1200 rpm. A delayed cut can also be done to the extrudate. One such example of a delayed cut device is a guillotine device.

The dryer, if one is used, generally comprises a plurality of drying zones in which the air temperature may vary. Examples known in the art include convection dryers. The extrudate will be present in the dryer for a time sufficient to produce an extrudate having the desired moisture content. Thus, the temperature of the air is not important; if a lower temperature is used (such as 50° C.) longer drying times will be required than if a higher temperature is used. Generally, the temperature of the air within one or more of the zones will be from about 100° C. to about 185° C. At such temperatures the extrudate is generally dried for at least about 45 minutes and more generally, for at least about 65 minutes. Suitable dryers include those manufactured by CPM Wolverine Proctor (Lexington, N.C.), National Drying Machinery Co. (Trevose, Pa.), Wenger (Sabetha, Kans.), Clextral (Tampa, Fla.), and Buehler (Lake Bluff, Ill.).

Another option is to use microwave assisted drying. In this embodiment, a combination of convective and microwave heating is used to dry the product to the desired moisture. Microwave assisted drying is accomplished by simultaneously using forced-air convective heating and drying to the surface of the product while at the same time exposing the product to microwave heating that forces the moisture that remains in the product to the surface whereby the convective heating and drying continues to dry the product. The convective dryer parameters are the same as discussed previously. The addition is the microwave-heating element, with the power of the microwave being adjusted dependent on the product to be dried as well as the desired final product moisture. As an example the product can be conveyed through an oven that contains a tunnel that is equipped with wave-guides to feed the microwave energy to the product and chokes designed to prevent the microwaves from leaving the oven. As the product is conveyed through the tunnel the convective and microwave heating simultaneously work to lower the moisture content of the product whereby drying. Typically, the air temperature is 50° C. to about 80° C., and the microwave power is varied dependent on the product, the time the product is in the oven, and the final moisture content desired.

The desired moisture content may vary widely depending on the intended application of the extrudate. Generally speaking, the extruded material has a moisture content of less than 10% moisture as a further example the material may have a moisture content typically from about 5% to about 13% by weight, if dried. Although not required in order to separate the fibers, hydrating in water until the water is absorbed is one way to separate the fibers. If the protein material is not dried or not fully dried and is to be used immediately, its moisture content can be higher, generally from about 16% to about 30% by weight. If a protein material with high moisture content is produced, the protein material may require immediate use or refrigeration to ensure product freshness, and minimize spoilage.

The extrudate may further be comminuted to reduce the average particle size of the extrudate. Typically, the reduced extrudate has an average particle size of from about 0.1 mm to about 40.0 mm. In one example, the reduced extrudate has an average particle size of from about 5.0 mm to about 30.0 mm. In another embodiment, the reduced extrudate has an average particle size of from about 0.5 mm to about 20.0 mm. In a further embodiment, the reduced extrudate has an average particle size of from about 0.5 mm to about 15.0 mm. In an additional embodiment, the reduced extrudate has an average particle size of from about 0.75 mm to about 10.0 mm. In yet another embodiment, the reduced extrudate has an average particle size of from about 1.0 mm to about 5.0 mm. Suitable apparatus for reducing particle size include hammer mills, such as Mikro Hammer Mills manufactured by Hosokawa Micron Ltd. (England), Fitzmill® manufactured by the Fitzpatrick Company (Elmhurst, Ill.), Comitrol® processors made by Urschel Laboratories, Inc. (Valparaiso, Ind.), and roller mills such as RossKamp Roller Mills manufactured by RossKamp Champion (Waterloo, Ill.).

(d) Characterization of the Colored Structured Protein Products

The colored structured protein products produced in II(a)-II(c) above, typically comprise protein fibers that are substantially aligned. In the context of this invention "substantially aligned" generally refers to the arrangement of protein fibers such that a significantly high percentage of the protein fibers forming the structured protein product are contiguous to each other at less than approximately a 45° angle when viewed in a horizontal plane. Typically, an average of at least 55% of the protein fibers comprising the structured protein product are substantially aligned. In another embodiment, an average of at least 60% of the protein fibers comprising the structured protein product are substantially aligned. In a further embodiment, an average of at least 70% of the protein fibers comprising the structured protein product are substantially aligned. In an additional embodiment, an average of at least 80% of the protein fibers comprising the structured protein product are substantially aligned. In yet another embodiment, an average of at least 90% of the protein fibers comprising the structured protein product are substantially aligned.

Figure 1:
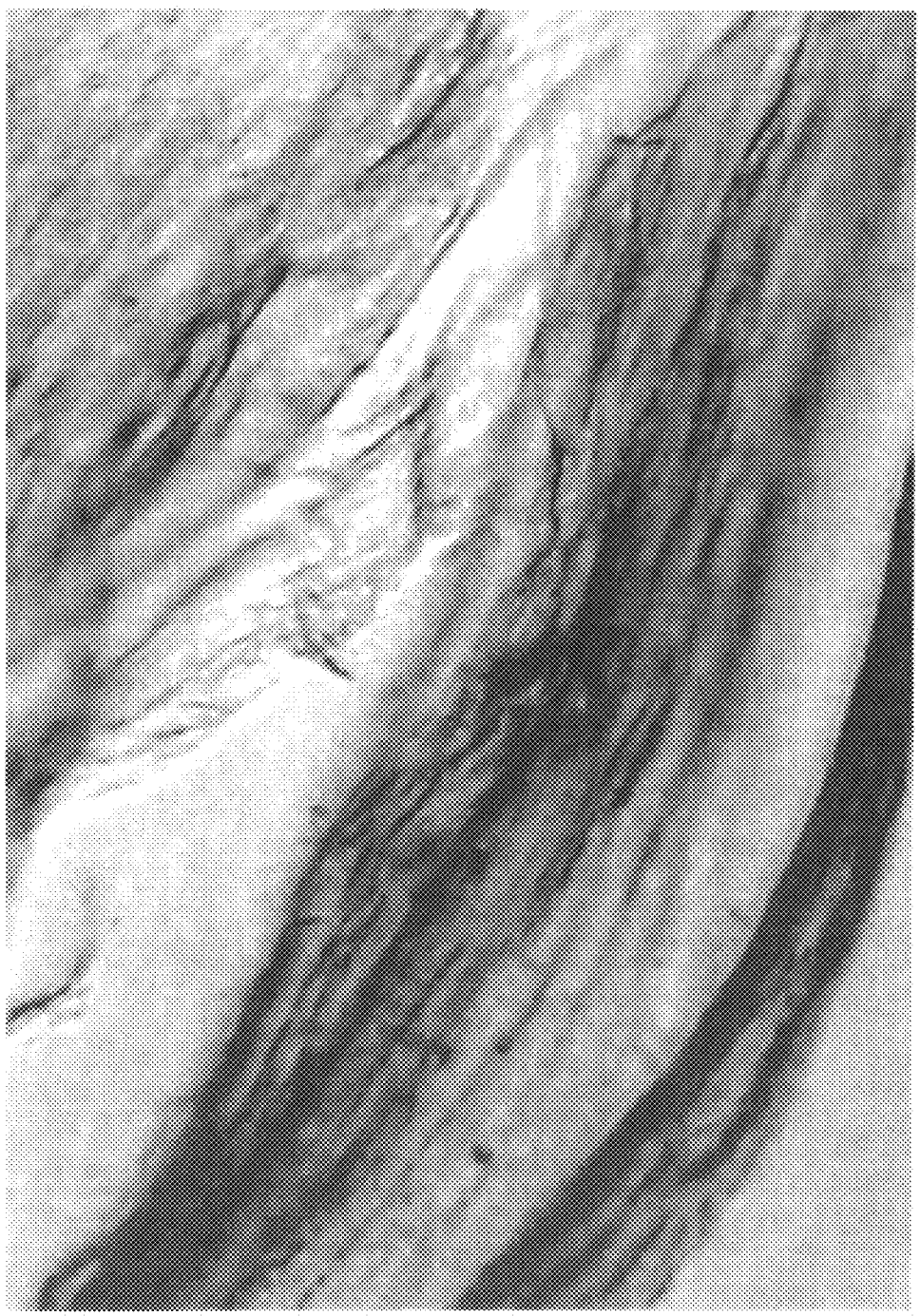
FIG. 1 depicts an image of a micrograph showing a colored structured protein product of the invention having protein fibers that are substantially aligned.
Figure 2:
FIG. 2 depicts an image of a micrograph showing a protein product not produced by the process of the present invention. The protein fibers comprising the protein product, as described herein, are crosshatched.

Methods for determining the degree of protein fiber alignment are known in the art and include visual determinations based upon micrographic images. By way of example, FIGS. 1 and 2 depict micrographic images that illustrate the difference between a structured protein product having substantially aligned protein fibers compared to a protein product having protein fibers that are significantly crosshatched. FIG. 1 depicts a structured protein product prepared according to II(a)-II(c) having protein fibers that are substantially aligned. Contrastingly, FIG. 2 depicts a protein product containing protein fibers that are significantly crosshatched and not substantially aligned. Because the protein fibers are substantially aligned, as shown in FIG. 1, the structured protein products utilized in the invention generally have the texture and consistency of animal meat. In contrast, traditional extrudates having protein fibers that are randomly oriented or crosshatched generally have a texture that is soft or spongy.

In addition to having protein fibers that are substantially aligned, the colored structured protein products of the invention also typically have shear strength substantially similar to whole meat muscle. In this context of the invention, the term "shear strength" provides one means to quantify the formation of a sufficient fibrous network to impart whole-muscle like texture and appearance to the colored structured protein product. Shear strength is the maximum force in grams needed to shear through a given sample. A method for measuring shear strength is described in Example 1. Generally speaking, the colored structured protein products of the invention will have average shear strength of at least 1400 grams. In an additional embodiment, the colored structured protein products will have average shear strength of from about 1500 to about 1800 grams. In yet another embodiment, the colored structured protein products will have average shear strength of from about 1800 to about 2000 grams. In a further embodiment, the colored structured protein products will have average shear strength of from about 2000 to about 2600 grams. In an additional embodiment, the colored structured protein products will have average shear strength of at least 2200 grams. In a further embodiment, the colored structured protein products will have average shear strength of at least 2300 grams. In yet another embodiment, the colored structured protein products will have average shear strength of at least 2400 grams. In still another embodiment, the colored structured protein products will have average shear strength of at least 2500 grams. In a further embodiment, the colored structured protein products will have average shear strength of at least 2600 grams.

A means to quantify the size of the protein fibers formed in the colored structured protein products may be done by a shred characterization test. Shred characterization is a test that generally determines the percentage of large pieces formed in the colored structured protein product. In an indirect manner, percentage of shred characterization provides an additional means to quantify the degree of protein fiber alignment in a colored structured protein product. Generally speaking, as the percentage of large pieces increases, the degree of protein fibers that are aligned within a colored structured protein product also typically increases. Conversely, as the percentage of large pieces decreases, the degree of protein fibers that are aligned within a colored structured protein product also typically decreases. A method for determining shred characterization is detailed in Example 2. The colored structured protein products of the invention typically have an average shred characterization of at least 10% by weight of large pieces. In a further embodiment, the colored structured protein products have an average shred characterization of from about 10% to about 15% by weight of large pieces. In another embodiment, the colored structured protein products have an average shred characterization of from about 15% to about 20% by weight of large pieces. In yet another embodiment, the colored structured protein products have an average shred characterization of from about 20% to about 25% by weight of large pieces. In another embodiment, the average shred characterization is at least 20% by weight, at least 21% by weight, at least 22% by weight, at least 23% by weight, at least 24% by weight, at least 25% by weight, or at least 26% by weight large pieces.

Suitable colored structured protein products of the invention generally have protein fibers that are substantially aligned, have average shear strength of at least 1400 grams, and have an average shred characterization of at least 10% by weight large pieces. More typically, the colored structured protein products will have protein fibers that are at least 55% aligned, have average shear strength of at least 1800 grams, and have an average shred characterization of at least 15% by weight large pieces. In exemplary embodiment, the colored structured protein products will have protein fibers that are at least 55% aligned, have average shear strength of at least 2000 grams, and have an average shred characterization of at least 17% by weight large pieces. In another exemplary embodiment, the colored structured protein products will have protein fibers that are at least 55% aligned, have average shear strength of at least 2200 grams, and have an average shred characterization of at least 20% by weight large pieces.

DEFINITIONS

The terms "animal meat" or "meat" as used herein refers to the muscles, organs, and by-products thereof derived from an animal, wherein the animal may be a land animal or an aquatic animal.

The term "comminuted meat" as used herein refers to a meat paste that is recovered from an animal carcass. The meat, on the bone, or the meat plus the bone is forced through a deboning device such that meat is separated from the bone and reduced in size. Meat that is off the bone would not be further treated with a deboning device. The meat is separated from the meat/bone mixture by forcing through a cylinder with small diameter holes. The meat acts as a liquid and is forced through the holes while the remaining bone material remains behind. The fat content of the comminuted meat may be adjusted upward by the addition of animal fat.

The term "extrudate" as used herein refers to the product of extrusion. In this context, the colored structured protein products comprising protein fibers that are substantially aligned may be extrudates in some embodiments.

The term "fiber" as used herein refers to a colored structured protein product having a size of approximately 4 centimeters in length and about 0.2 centimeters in width after the shred characterization test detailed in Example 2 is performed.

The term "gluten" as used herein refers to a protein fraction in cereal grain flour, such as wheat, that possesses a high content of protein as well as unique structural and adhesive properties.

The term "large piece" as used herein is the manner in which a colored structured protein product's shred percentage is characterized. The determination of shred characterization is detailed in Example 2.

The term "protein fiber" as used herein refers the individual continuous filaments or discrete elongated pieces of varying lengths that together define the structure of the protein products of the invention. Additionally, because the protein products of the invention have protein fibers that are substantially aligned, the arrangement of the protein fibers impart the texture of whole meat muscle to the protein products.

The term "soy cotyledon fiber" as used herein refers to the polysaccharide portion of soy cotyledons containing at least about 70% dietary fiber. Soy cotyledon fiber typically contains some minor amounts of soy protein, but may also be 100% fiber. Soy cotyledon fiber, as used herein, does not refer to, or include, soy hull fiber. Generally, soy cotyledon fiber is formed from soybeans by removing the hull and germ of the soybean, flaking or grinding the cotyledon and removing oil from the flaked or ground cotyledon, and separating the soy cotyledon fiber from the soy protein material and carbohydrates of the cotyledon.

The term "soy flour" as used herein, refers to full fat soy flour, enzyme-active soy flour, defatted soy flour, and mixtures thereof. Defatted soy flour refers to a comminuted form of defatted soybean material, preferably containing less than about 1% oil, formed of particles having a size such that the particles can pass through a No. 100 mesh (U.S. Standard) screen. The soy cake, chips, flakes, meal, or mixture of the material are comminuted into soy flour using conventional soy grinding processes. Soy flour has a soy protein content of about 49% to about 65% on a moisture free basis. Preferably the flour is very finely ground, most preferably so that less than about 1% of the flour is retained on a 300 mesh (U.S. Standard) screen. Full fat soy flour refers to ground whole soybeans containing all of the original oil, usually 18% to 20%. The flour may be enzyme-active or it may be heat-processed or toasted to minimize enzyme activity. Enzyme-active soy flour refers to a full fat soy flour that has been minimally heat-treat in order not to neutralize its natural enzyme.

The term "soy protein concentrate" as used herein is a soy material having a protein content of from about 65% to less than about 90% soy protein on a moisture-free basis. Soy protein concentrate also contains soy cotyledon fiber, typically from about 3.5% up to about 20% soy cotyledon fiber by weight on a moisture-free basis. A soy protein concentrate is formed from soybeans by removing the hull and germ of the soybean, flaking or grinding the cotyledon and removing oil from the flaked or ground cotyledon, and separating the soy protein and soy cotyledon fiber from the soluble carbohydrates of the cotyledon.

The term "soy protein isolate" as used herein is a soy material having a protein content of at least about 90% soy protein on a moisture free basis. A soy protein isolate is formed from soybeans by removing the hull and germ of the soybean from the cotyledon, flaking or grinding the cotyledon and removing oil from the flaked or ground cotyledon, separating the soy protein and soluble carbohydrates of the cotyledon from the cotyledon fiber, and subsequently separating the soy protein from the soluble carbohydrates.

The term "starch" as used herein refers to starches derived from any native source. Typically sources for starch are cereals, tubers, roots, and fruits.

The term "strand" as used herein refers to a colored structured protein product having a size of approximately 2.5 to about 4 centimeters in length and greater than approximately 0.2 centimeter in width after the shred characterization test detailed in Example 2 is performed.

The term "wheat flour" as used herein refers to flour obtained from the milling of wheat. Generally speaking, the particle size of wheat flour is from about 14 to about 120 μm.

The invention having been generally described above may be better understood by reference to the examples described below. The following examples represent specific but non-limiting embodiments of the present invention.

EXAMPLES

The following examples illustrate properties of the colored structure protein products and the processes to produce them.

Example 1

Determination of Shear Strength of the Colored Structured Protein Product

Shear strength of a sample is measured in grams and may be determined by the following procedure. Weigh a sample of the structured protein product and place it in a heat sealable pouch and hydrate the sample with approximately three times the sample weight of room temperature tap water. Evacuate the pouch to a pressure of about 0.01 Bar and seal the pouch. Permit the sample to hydrate for about 12 to about 24 hours. Remove the hydrated sample and place it on the texture analyzer base plate oriented so that a knife from the texture analyzer will cut through the diameter of the sample. Further, the sample should be oriented under the texture analyzer knife such that the knife cuts perpendicular to the long axis of the textured piece. A suitable knife used to cut the extrudate is a model TA-45, incisor blade manufactured by Texture Technologies (USA). A suitable texture analyzer to perform this test is a model TA, TXT2 manufactured by Stable Micro Systems Ltd. (England) equipped with a 25, 50, or 100 kilogram load. Within the context of this test, shear strength is the maximum force in grams needed to shear through the sample.

Example 2

Determination of Shred Characterization of the Colored Structured Protein Product A procedure for determining shred characterization may be performed as follows. Weigh about 150 grams of a structured protein product using whole pieces only. Place the sample into a heat-sealable plastic bag and add about 450 grams of water at 25° C. Vacuum seal the bag at about 156 mm Hg and allow the contents to hydrate for about 60 minutes. Place the hydrated sample in the bowl of a Kitchen Aid mixer model KM14G0 equipped with a single blade paddle and mix the contents at 130 rpm for two minutes. Scrape the paddle and the sides of the bowl, returning the scrapings to the bottom of the bowl. Repeat the mixing and scraping two times. Remove ~200 g of the mixture from the bowl. Separate the ~200 g of mixture into one of three groups. Group 1 is the portion of the sample having fibers at least 4 centimeters in length and at least 0.2 centimeters wide. Group 2 is the portion of the sample having strands between 2.5 cm and 4.0 cm long, and which are ≧0.2 cm wide. Group 3 is the portion that does not fit within the parameters of Group 1 or Group 2. Weigh each group, and record the weight. Add the weights of Group 1 and Group 2 together, and divide by the starting weight (e.g. ~200 g). This determines the percentage of large pieces in the sample. If the resulting value is below 15%, or above 20%, the test is complete. If the value is between 15% and 20%, then weigh out another ~200 g from the bowl, separate the mixture into the three groups, and perform the calculations again.

Example 3

Production of Colored Structured Protein Products

The following extrusion process may be used to prepare the colored structured protein products of the invention, such as the structured protein products utilized in Examples 1 and 2. A red colored structured protein product is made by combining the ingredients listed in Table 1 in a paddle blender.

TABLE 1

| Formulation | |
| --- | --- |
| Ingredient | Amount (%) |
| SUPRO ® 620 (soy isolate) | 59.16 |
| Manildra wheat gluten | 26.00 |
| Wheat starch | 12.00 |
| FIBRIM ® 2000 | 2.00 |
| Dicalcium phosphate | 0.50 |
| L-cysteine | 0.10 |
| Carmine (#3405 Sensient Colors, Inc.) | 0.24 |
| Total | 100.00 |

The contents are mixed to form a dry blended soy protein mixture. The dry blend is then transferred to a hopper from which the dry blend is introduced into a preconditioner along with water to form a conditioned soy protein pre-mixture. The conditioned soy protein pre-mixture is then fed to a twin-screw extrusion apparatus at a rate of not more than 75 kg/minute. The extrusion apparatus comprises six temperature control zones, with the protein mixture being controlled to a temperature of from about 50° C. in the first zone, about 80° C. in the second zone, about 80° C. in the third zone, about 100° C. in the fourth zone, about 125° C. in the fifth zone, and about 120° C. in the six zone. The extrusion mass is subjected to a head pressure from about 50 psig to about 1500 psig. Water is injected into the extruder barrel, via one or more injection jets in communication with a heating zone. The molten extruder mass exits the extruder barrel through a die assembly consisting of a die and a backplate. As the mass flows through the die assembly the protein fibers contained within are substantially aligned with one another forming a fibrous extrudate. As the fibrous extrudate exits the die assembly, it is cut with flexible knives and the cut mass is then dried to a moisture content of about 10% by weight.

While the invention has been explained in relation to exemplary embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A process for producing a colored structured protein product having protein fibers that are substantially aligned, the process comprising:
   a. combining a protein material with at least one colorant to form a blended protein mixture; and
   b. extruding the blended protein mixture under conditions of elevated temperature and pressure through a die assembly comprising:
      i. a die sleeve having a back portion and a front portion collectively defining an interior chamber;
      ii. a die insert disposed inside the interior chamber, the die insert including an insert body having a front face and a rear face with the front face defining a bottom portion and a plurality of flow diverters with a tapered flow pathway being defined between the bottom portion and any two adjacent of the plurality of flow diverters; and
      iii. a die cone coupled to said die sleeve wherein said die cone and said flow pathway collectively define a fully tapered flow channel,
   wherein the process produces a colored structured protein product comprising protein fibers that are substantially aligned.

2. The process of claim 1, wherein the tapered flow pathway is tapered along at least three sides.

3. The process of claim 1, wherein the at least one colorant is selected from the group consisting of carmine (soluble and flake forms), caramel, annatto, FD & C Red No. 40, titanium dioxide, and combinations thereof.

4. The process of claim 3, wherein the colored structured protein product comprises from about 0.001% to about 5.0% colorant on a dry matter basis.

5. The process of claim 1, wherein the colored structured protein product has an average shear strength of at least 1400 grams and an average shred characterization of at least 10%.

6. The process of claim 1, wherein the protein material is a plant protein material selected from the group consisting of soy protein, corn, peas, canola, sunflowers, sorghum, rice, amaranth, potato, tapioca, arrowroot, channa, lupin, rape, wheat, oats, rye, barley, and mixtures thereof.

7. The process of claim 6, wherein the plant protein material comprises soy protein.

8. The process of claim 1, further comprising combining at least one animal protein material with a plant protein, wherein the animal protein material is selected from the group consisting of casein, caseinates, whey protein, ovalbumin, ovoglobulin, ovomucin, ovomucoid, ovotransferrin, ovovitella, ovovitellin, albumin globulin, vitellin, and combinations thereof.

9. The process of claim 1, wherein the protein material has from about 40% to about 75% protein on a dry mater basis.

10. The process of claim 1, wherein the protein material comprises:
   a. from about 45% to about 65% soy protein on a dry matter basis;
   b. from about 20% to about 30% wheat gluten on a dry matter basis;
   c. from about 10% to about 15% wheat starch on a dry matter basis; and,
   d. from about 1% to about 5% fiber on a dry matter basis.

11. The process of claim 10, wherein the protein material further comprises additional ingredients including an agent selected from the group consisting of flavoring agents, fat source, antioxidant, binding agent, pH-regulating agent, vitamin, mineral, polyunsaturated fatty acid, and combinations thereof.

12. The process of claim 11, wherein the pH-regulating agent is an acidulent selected from the group consisting of citric acid, acetic acid, tartiaric acid, malic acid, fumaric acid, lactic acid, phosphoric acid, sorbic acid, benzoic acid, and combinations thereof.

13. The process of claim 1, wherein the extrusion temperature is from about 50° C. to about 150° C. and the pressure is from about 50 psig to about 3000 psig.

14. The process of claim 1 wherein the protein material comprises from about 45% to about 65% plant protein on a dry matter basis; from about 20% to about 30% wheat gluten on a dry matter basis; from about 10% to about 15% wheat starch on a dry matter basis; and from about 1% to about 5% fiber on a dry matter basis.

15. The process of claim 1, wherein the at least one colorant is injected into a barrel of the extruder.

16. The process of claim 1, wherein the colored structured protein product comprises protein, starch, gluten, fiber, and mixtures thereof.

17. The process of claim 16, wherein the protein material further comprises dicalcium phosphate and L-cysteine.

18. A process for producing a colored structured protein product having protein fibers that are substantially aligned, the process comprising:
   a. combining at least one colorant with a protein mixture while inside a extruder; and
   b. extruding the protein mixture under conditions of elevated temperature and pressure through a die assembly to form a colored structured protein product comprising protein fibers that are substantially aligned, wherein the die assembly comprises:
      i. a cylindrically-shaped die sleeve defining a plurality of outlets, the die sleeve further defining an interior area in communication with the plurality of outlets,
      ii. a die insert disposed inside the interior area of the die sleeve, the die insert including a base with a cone portion extending outwardly form the base, and a plurality of raised flow diverters circumferentially-spaced around the base with a flow pathway defined between adjacent flow diverters, wherein the flow pathway is in communication with a respective outlet at one end and the cone portion at the opposite end thereof; and
      iii. an endplate engaged to the die insert through the die sleeve.

19. The process of claim 18, further comprising injecting at least one colorant into a barrel of the extruder.

20. The process of claim 18, wherein the protein mixture comprises soy protein.

* * * * *